United States Patent
Konishi et al.

(10) Patent No.: US 12,167,131 B2
(45) Date of Patent: Dec. 10, 2024

(54) IMAGE CAPTURING APPARATUS CAPABLE OF CONTROLLING CONTINUOUS PHOTOGRAPHING ACCORDING TO MOTION OF AN OBJECT AND SHAKE INFORMATION, METHOD OF CONTROLLING SAME, AND STORAGE MEDIUM

(71) Applicant: CANON KABUSHIKI KAISHA, Tokyo (JP)

(72) Inventors: Kazuki Konishi, Tokyo (JP); Minami Furuta, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 72 days.

(21) Appl. No.: 17/982,738

(22) Filed: Nov. 8, 2022

(65) Prior Publication Data

US 2023/0144310 A1 May 11, 2023

(30) Foreign Application Priority Data

Nov. 11, 2021 (JP) ................. 2021-184173

(51) Int. Cl.
*H04N 23/68* (2023.01)
*G06T 5/50* (2006.01)
(Continued)

(52) U.S. Cl.
CPC ............. *H04N 23/682* (2023.01); *G06T 5/50* (2013.01); *G06T 5/73* (2024.01); *G06T 7/20* (2013.01);
(Continued)

(58) Field of Classification Search
CPC .... H04N 23/682; H04N 5/2625; H04N 23/76; H04N 23/663; H04N 23/667;
(Continued)

(56) References Cited

U.S. PATENT DOCUMENTS

2009/0128640 A1* 5/2009 Yumiki .............. H04N 23/6811
359/554
2014/0300774 A1* 10/2014 Gwak ................ H04N 21/8153
348/231.2
(Continued)

FOREIGN PATENT DOCUMENTS

JP 2006-337458 A 12/2006
JP 2009-152803 A 7/2009
(Continued)

*Primary Examiner* — Padma Haliyur
(74) *Attorney, Agent, or Firm* — Cowan, Liebowitz & Latman, P.C.

(57) ABSTRACT

An image capturing apparatus capable of obtaining a high-quality image according to a continuous photographing mode and a shake state. In the image capturing apparatus, a plurality of types of a continuous photographing mode which are different in continuous photographing speed are set, a motion of an object is acquired from an input image, and shake information concerning a shake of the image capturing apparatus is acquired. Exposure conditions for photographing are controlled based on a type of the continuous photographing mode, the motion of the object, and the shake information, and in a case where image combination is performed, the number of images to be combined is determined.

17 Claims, 12 Drawing Sheets

(51) Int. Cl.
*G06T 5/73* (2024.01)
*G06T 7/20* (2017.01)

(52) U.S. Cl.
CPC .............. *G06T 2207/10144* (2013.01); *G06T 2207/20201* (2013.01); *G06T 2207/20221* (2013.01)

(58) Field of Classification Search
CPC ........... H04N 23/6811; H04N 23/6812; H04N 23/684; H04N 23/72; H04N 23/73; G06T 5/50; G06T 5/73; G06T 7/20; G06T 2207/10144; G06T 2207/20201; G06T 2207/20221; G06T 2207/20208; G06T 7/215

See application file for complete search history.

(56) References Cited

U.S. PATENT DOCUMENTS

| | | | | |
|---|---|---|---|---|
| 2014/0354834 | A1* | 12/2014 | Narita | H04N 23/682 |
| | | | | 348/208.4 |
| 2016/0261784 | A1* | 9/2016 | Mukunashi | H04N 23/73 |
| 2018/0063436 | A1* | 3/2018 | Miyazawa | H04N 23/6815 |
| 2020/0128191 | A1* | 4/2020 | Sun | H04N 23/743 |
| 2023/0133045 | A1* | 5/2023 | Ito | H04N 23/633 |
| | | | | 348/333.02 |

FOREIGN PATENT DOCUMENTS

| | | | | |
|---|---|---|---|---|
| JP | 2019-071536 A | | 5/2019 | |
| WO | WO-2021192724 A1 * | | 9/2021 | ............. G03B 17/14 |

\* cited by examiner

IMAGE CAPTURING APPARATUS CAPABLE OF CONTROLLING CONTINUOUS PHOTOGRAPHING ACCORDING TO MOTION OF AN OBJECT AND SHAKE INFORMATION, METHOD OF CONTROLLING SAME, AND STORAGE MEDIUM

BACKGROUND OF THE INVENTION

Field of the Invention

The present invention relates to an image capturing apparatus capable of obtaining a high-quality image, a method of controlling the same, and a storage medium.

Description of the Related Art

An image capturing apparatus, such as a digital camera or a smartphone, has come into practical use, which captures a high-quality image by controlling the exposure conditions (exposure parameters) (such as exposure time, ISO sensitivity, and an aperture value) using elements other than a photometric value and photographing a plurality of images. For example, a conventional image capturing apparatus reduces the blur of an image, by changing exposure time according to a detected amount of motion of an object or a detected amount of blur of an image, or by selecting an image small in the amount of blur from a plurality of photographed images, or by combining the plurality of images. Such techniques are disclosed in Japanese Laid-Open Patent Publication (Kokai) No. 2009-152803, Japanese Laid-Open Patent Publication (Kokai) No. 2019-71536, and Japanese Laid-Open Patent Publication (Kokai) No. 2006-337458.

Japanese Laid-Open Patent Publication (Kokai) No. 2009-152803 discloses an apparatus that corrects a camera shake, by combining a plurality of underexposed images continuously photographed at a high shutter speed less likely to be affected by a camera shake. In this apparatus, even when the number of combined images reaches an upper limit number, the sensitivity is controlled to be increased with reference to an upper limit value of the sensitivity if the images are underexposed.

Japanese Laid-Open Patent Publication (Kokai) No. 2019-71536 discloses an apparatus that, in a case where an exposure correction value is not within a predetermined range, does not perform automatic exposure control during a continuous photographing operation in a continuous photographing mode in which continuous photographing is performed at high speed, so as to reduce generation of an image formed by an unintended exposure amount in the continuous photographing.

Japanese Laid-Open Patent Publication (Kokai) No. 2006-337458 discloses an apparatus that employs, when a camera shake is detected, a second program diagram which is high in shutter speed, for some of luminance areas in a field, to thereby set the shutter speed to the high-speed side.

There are a variety of conditions and situations of photographing, such as a type or characteristics (a signal readout time, a frame interval, a predicted vibration, and so forth) of the continuous photographing mode, a state of an object (whether standstill or moving, or the like), a power supply condition, the magnitude of a camera shake, frequency characteristics, and so forth. It is difficult to set the exposure time and the number of images to be combined according to these many conditions.

However, in Japanese Laid-Open Patent Publication (Kokai) No. 2009-152803, the number of images to be combined and the sensitivity are set by the same method regardless of the settings of the continuous photographing mode, and hence it is difficult to set the number of images to be combined and the sensitivity suitable for the characteristics of the continuous photographing mode.

In Japanese Laid-Open Patent Publication (Kokai) No. 2019-71536, in the continuous photographing mode for performing continuous photographing at high speed, the automatic exposure control is not always performed during the continuous photographing operation, and hence it is difficult to always obtain proper exposure.

In Japanese Laid-Open Patent Publication (Kokai) No. 2006-337458, when a camera shake is detected, the second program diagram which is high in shutter speed is uniformly employed regardless of the characteristics of the continuous photographing mode, and hence it is difficult to set a shutter speed (exposure time) suitable for the characteristics of the continuous photographing mode.

Therefore, there is room for improvement of acquisition of a high-quality image by comprehensively taking the characteristics of the continuous photographing mode and a shake state into consideration.

SUMMARY OF THE INVENTION

The present invention provides an image capturing apparatus that is capable of obtaining a high-quality image according to a continuous photographing mode and a shake state.

In a first aspect of the present invention, there is provided an image capturing apparatus including at least one processor, and a memory coupled to the at least one processor, the memory having instructions that, when executed by the processor, perform the operations as: a setting unit configured to set a plurality of types of a continuous photographing mode which are different in continuous photographing speed, a first acquisition unit configured to acquire a motion of an object from an input image, a second acquisition unit configured to acquire shake information concerning a shake of the image capturing apparatus, and a control unit configured to control exposure conditions for photographing, based on a type of the continuous photographing mode, a motion of the object, and the shake information, and determine, in a case where image combination is performed, the number of images to be combined.

In a second aspect of the present invention, there is provided a method of controlling an image capturing apparatus, including setting a plurality of types of a continuous photographing mode which are different in continuous photographing speed, acquiring a motion of an object from an input image, acquiring shake information concerning a shake of the image capturing apparatus, and controlling exposure conditions for photographing, based on a type of the continuous photographing mode, the motion of the object, and the shake information, and determining, in a case where image combination is performed, the number of images to be combined.

According to the present invention, it is possible to obtain a high-quality image according to a continuous photographing mode and a shake state.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
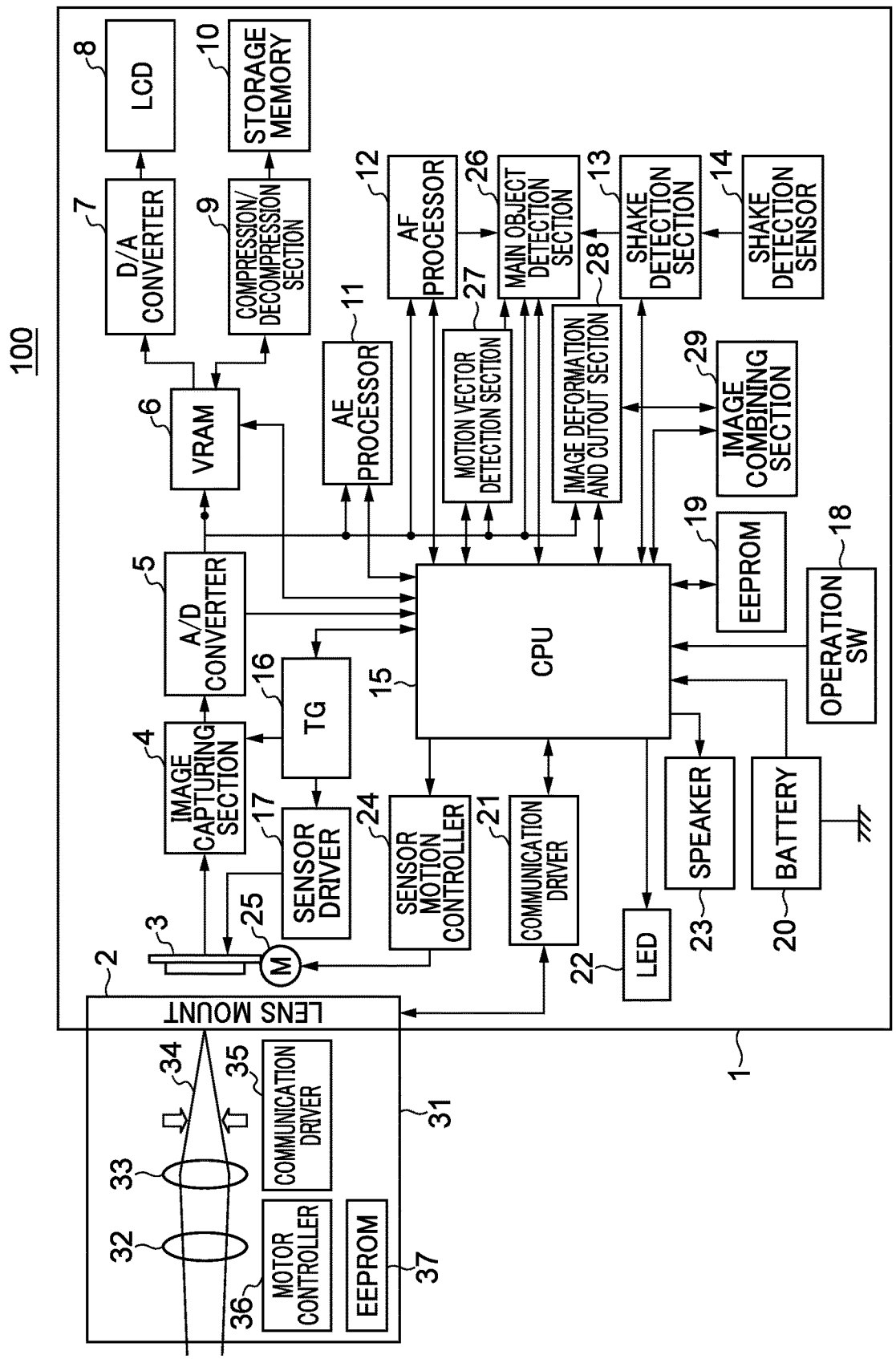
FIG. 1 is a block diagram of an image capturing apparatus.

FIG. 1 is a block diagram of an image capturing apparatus according to a first embodiment of the present invention. The image capturing apparatus, denoted by reference numeral 100, is configured e.g. as a digital camera. The image capturing apparatus 100 is formed by removably attaching an interchangeable lens 31 to an image capturing apparatus body 1.

In the image capturing apparatus body 1, a lens mount 2 is provided to attach the interchangeable lens 31. Light transmitted through a photographing optical system in the interchangeable lens 31 forms an image on an image sensor 3 as an object image, and the image is photoelectrically converted. An image capturing section 4 generates image signals by performing a variety of image processing operations on the electrical signals photoelectrically converted by the image sensor 3. An analog-to-digital converter 5 converts the analog image signals generated by the image capturing section 4 to digital image signals. A memory (VRAM) 6, formed by a buffer memory and the like, is responsive to an output from the analog-to-digital converter 5 to temporarily store the image data therein. A digital-to-analog converter 7 reads out image data stored in the VRAM 6 and converts the digital data to analog image signals in a form suitable for reproduction output. An image display device (hereinafter referred to as the LCD) 8, such as a liquid crystal display device (LCD), displays these image signals. A storage memory 10 is implemented e.g. by a semiconductor memory and stores the image data.

A compression/decompression section 9 has a compression section that reads image data temporarily stored in the VRAM 6 and performs processing for compressing and encoding the image data so as to convert the image data to a form suitable for storage in the storage memory 10. Further, the compression/decompression section 9 also has a decompression section that performs decoding and decompressing of image data stored in the storage memory 10 to convert the image data to a form suitable for reproduction display and the like. An AE processor 11 is responsive to an output from the analog-to-digital converter 5, for performing automatic exposure (AE) processing. Further, in response to the output from the analog-to-digital converter 5, an AF processor 12 generates an AF evaluation value for performing automatic focus adjustment (AF) processing, and further, detects a defocus amount.

A shake detection sensor 14 detects a motion of the image capturing apparatus 100, such as a camera shake. The shake detection sensor 14 is implemented by an inertia sensor, such as a gyro sensor or an accelerometer, and detects multi-axial shakes using a plurality of such sensors. A shake detection section 13 processes a gyro signal output from the shake detection sensor 14 (detection signal). A CPU 15 is implemented by a microcomputer that incorporates a calculation memory and controls the overall operation of the image capturing apparatus 100. A timing generator (hereinafter referred to as the TG) 16 generates a predetermined timing signal. A sensor driver 17 drives the image sensor 3. An operation switch 18 is formed by a group of a variety of switches (SW). An EEPROM 19 is an electrically rewritable read-only-memory and stores, in advance, programs for performing a variety of controls, and data used when causing a variety of operations to be performed.

A battery 20 is a power supply for the whole image capturing apparatus 100. A communication driver 21 performs communication with the interchangeable lens 31. An LED 22 is a display device that performs display including warning display. A sensor moving motor 25 is a driving source for moving the image sensor 3 in a horizontal direction, a vertical direction, and a rotational direction. A sensor motion controller 24 controls the operation of the sensor moving motor 25. A motion vector detection section 27 is responsive to the output from the analog-to-digital converter 5, for performing processing for detecting a motion vector of an object. Based on outputs from the motion vector detection section 27, the analog-to-digital converter 5, and the CPU 15, a main object detection section 26 performs main object detection processing. The main object detection section 26 identifies a main object and detects the position of the main object within a screen and the size of the main object.

An image deformation and cutout section 28 performs image processing, such as rotation and expansion/reduction of an image and trimming (cutout) of an image. An image combining section 29 as a combining unit combines images cut out by the image deformation and cutout section 28. A plurality of images obtained through continuous photographing are processed by the image deformation and cutout section 28 and the image combining section 29, whereby it is possible to obtain a new image. A speaker 23 is a sound source for performing an in-focus notification, an out-of-focus warning, and so forth.

On the other hand, in the interchangeable lens 31, a shake correction lens 32 is an optical system element for moving an object image on an imaging surface of the image sensor 3 to correct an image blur. A focus lens 33 is an optical system element for adjusting an imaging position of an object image in an optical axis direction to thereby focus on the object. A diaphragm 34 controls an amount of light transmitted through the photographing optical system formed by the shake correction lens 32, the focus lens 33, and so forth. A communication driver 35 performs communication with the image capturing apparatus body 1. A motor controller 36 controls a diaphragm driving motor that drives the diaphragm 34, a focus driving motor that drives the focus lens 33, and a shake correction lens-driving motor that drives the shake correction lens 32 (none of which are shown). An EEPROM 37 is an electrically rewritable read-only-memory and stores data and the like used to cause associated components to perform a variety of operations, in advance. Besides these components, the interchangeable lens 31 includes a zoom ring for changing a focal length and a manual focus ring for adjusting the focus (neither of which is shown).

Note that as the storage memory 10 which is a storage medium, a fixed-type semiconductor memory, such as a flash memory, or a semiconductor memory that has a card shape or a stick shape and is removably attached to an apparatus, such as a card-type flash memory, is used. Alternatively, the storage memory 10 may be a hard disk or the like.

The operation switch 18 includes a main power switch for starting up the image capturing apparatus body 1 and supplying electric power, a release switch for starting a moving image photographing operation (recording operation) and the like operations, a reproduction switch for starting a reproduction operation, and so forth. The release switch is formed by a two-step switch having a first stroke switch (hereinafter referred to as the SW1) and a second stroke switch (hereinafter referred to as the SW2). When the SW1 is turned on, an instruction signal for starting photographing preparation operations, such as the AE processing and the AF processing, which are performed before the photographing operation, is generated. When the SW2 is turned on, an instruction signal for starting an actual exposure operation is generated. Further, the operation switch 18 includes a photographing mode-setting dial, an exposure correction amount-changing dial, an exposure time-changing dial, an aperture value-changing dial, a continuous photographing mode-setting switch, and so forth.

The above-mentioned continuous photographing mode-setting switch is configured such that it is not only possible to select between single and continuous photographing modes, but also possible to select between a plurality of types of the continuous photographing mode which are different in sensor readout rate (different in continuous photographing speed) in a case where the continuous photographing mode is selected. Therefore, a type of the continuous photographing mode is set based on a user operation. The types of the continuous photographing mode, which can be set, include a very-high-speed continuous photographing mode, a high-speed continuous photographing mode, and a low-speed continuous photographing mode. These continuous photographing modes are different in characteristics, such as time for reading out signals from a sensor and an interval (blanking period) of reading out the signals, due to differences in the number of channels and a readout driving frequency when reading out the signals from the sensor. Therefore, the characteristics of the continuous photographing mode, such as the number of images photographed per unit time, an effect of suppressing distortion caused by the motion of an object, and power consumption, are different.

The operation of the image capturing apparatus 100 configured as described above will be described. First, a light flux from an object, transmitted through the interchangeable lens 31 and adjusted in light amount, forms an image on a light receiving surface of the image sensor 3. The formed object image is converted to electrical signals by photoelectric conversion performed by the image sensor 3 and the electrical signals are output to the image capturing section 4. The image capturing section 4 performs a variety of signal processing operations on the signals input thereto to thereby generate predetermined image signals. The image signals are output to the analog-to-digital converter 5 to be converted to digital signals (image data), and then the image data is not only temporarily stored in the VRAM 6, but also output to the AE processor 11, the AF processor 12, the motion vector detection section 27, the main object detection section 26, and the image deformation and cutout section 28.

The image data stored in the VRAM 6 is output to the digital-to-analog converter 7 so as to be converted to analog image signals in a form suitable for display, and then the analog image signals are displayed on the LCD 8 as an image. The image data stored in the VRAM 6 is also output to the compression/decompression section 9. The image data input to the compression/decompression section 9 is compressed by the compression section of the compression/decompression section 9 so as to be converted to image data in a form suitable for storage, and the resulting data is stored in the storage memory 10.

Based on the digital image signals input to the AE processor 11, the AE processor 11 calculates an AE evaluation value according to the brightness of the object. This AE evaluation value is output to the CPU 15. Then, the CPU 15 calculates exposure time for the image sensor 3 and an aperture value of the diaphragm 34, and transmits information on a result of calculation to the interchangeable lens 31 via the communication driver 21. In response to the information, the interchangeable lens 31 performs diaphragm driving processing and the like so as to adjust the aperture amount of the diaphragm 34 to a proper amount.

The AF processor 12 performs image correction of the image signals acquired by the image sensor 3 having image capturing pixels for focus adjustment, and correlation calculation of the corrected image signals to detect a defocus amount. The CPU 15 determines a driving amount and a driving direction of the focus lens 33 and transmits the determined driving amount and driving direction to the interchangeable lens 31 via the communication driver 21. According to the received driving amount and driving direction, the interchangeable lens 31 performs the processing for driving the focus lens 33, whereby it is possible to perform the AF control for obtaining the in-focus state.

The main object detection section 26 detects an object appearing to be a person, an object appearing to be an animal, and other things appearing to be objects, from image data input from the digital-to-analog converter 7. The main object detection section 26 receives a setting of the operation switch 18, a result of processing performed by the AE processor 11, and color temperature information of the object, obtained for AWB processing, from the CPU 15, and receives object distance information of a thing appearing to be an object, from the AF processor 12. Further, the main object detection section 26 receives motion information of a thing appearing to be an object from the motion vector detection section 27, and receives a detection-processed signal (gyro signal after integration) from the shake detection section 13. Then, the main object detection section 26 identifies a main object using these received items of information and detects a position and a size of the identified main object.

Upon receipt of the input digital image signals (reference image), the motion vector detection section 27 performs correlation calculation between the input digital image signals and the digital image signals of one frame before (referred image) according to areas divided according to an instruction from the CPU 15. With this, the motion vector detection section 27 calculates motion vectors of the object within each divided area.

More specifically, the motion vector detection section 27 performs difference calculation between the reference image and the referred image while shifting the referred image by a predetermined number of pixels in the horizontal and vertical directions, and sets a pixel shift amount exhibiting the highest correlation degree (smallest difference amount) as the motion amount of the object in the corresponding area. Then, the motion vector detection section 27 sets pixel shift directions in the horizontal and vertical directions at the time as the moving directions. With this, it is possible to determine a motion vector of the object within the area between the frames. The CPU 15 detects a motion of the background and a motion of the object based on the motion vectors in each area and the main object information received from the main object detection section 26.

The image deformation and cutout section 28 receives information on the motions of the object in upper, lower, right, and left directions on the image, which are calculated by the CPU 15 based on outputs received from the main object detection section 26 and the motion vector detection section 27, and information on the rotation of the image capturing apparatus 100. Then, to correct the motion and rotation according to the received information, the image deformation and cutout section 28 performs deformation, such as image rotation, and image processing, such as cutting out of part of the image. The image obtained as a result of the image processing is recorded in a predetermined area of the VRAM 6 or output to the image combining section 29.

For example, the position of an object detected as a main object or the position of the background on the screen is sometimes changed by a hand shake of a photographer. If such a shake occurs between a plurality of images obtained through continuous photographing, an unnatural line or the like may be generated in a combined image or the resolution may be degraded.

To prevent this, the motion vector detection section 27 detects a positional shift between a plurality of images, and the image deformation and cutout section 28 geometrically deforms the image so as to correct the positional shift. Then, the image combining section 29 adds the plurality of images whose positions have been aligned by geometric deformation, whereby shake correction (positional shift correction) is performed through image combination.

Next, an exposure control operation of the image capturing apparatus 100 configured as described above, i.e. an operation for setting exposure coefficients (exposure conditions) and the number of images to be combined will be described with reference to a flowchart in FIG. 2. Here, the exposure coefficients include exposure parameters, such as exposure time (Tv), an aperture value (Av), and ISO sensitivity (Sv). The number of images to be combined is the number of a plurality of images to be photographed in the continuous photographing mode and be combined.

Figure 2:
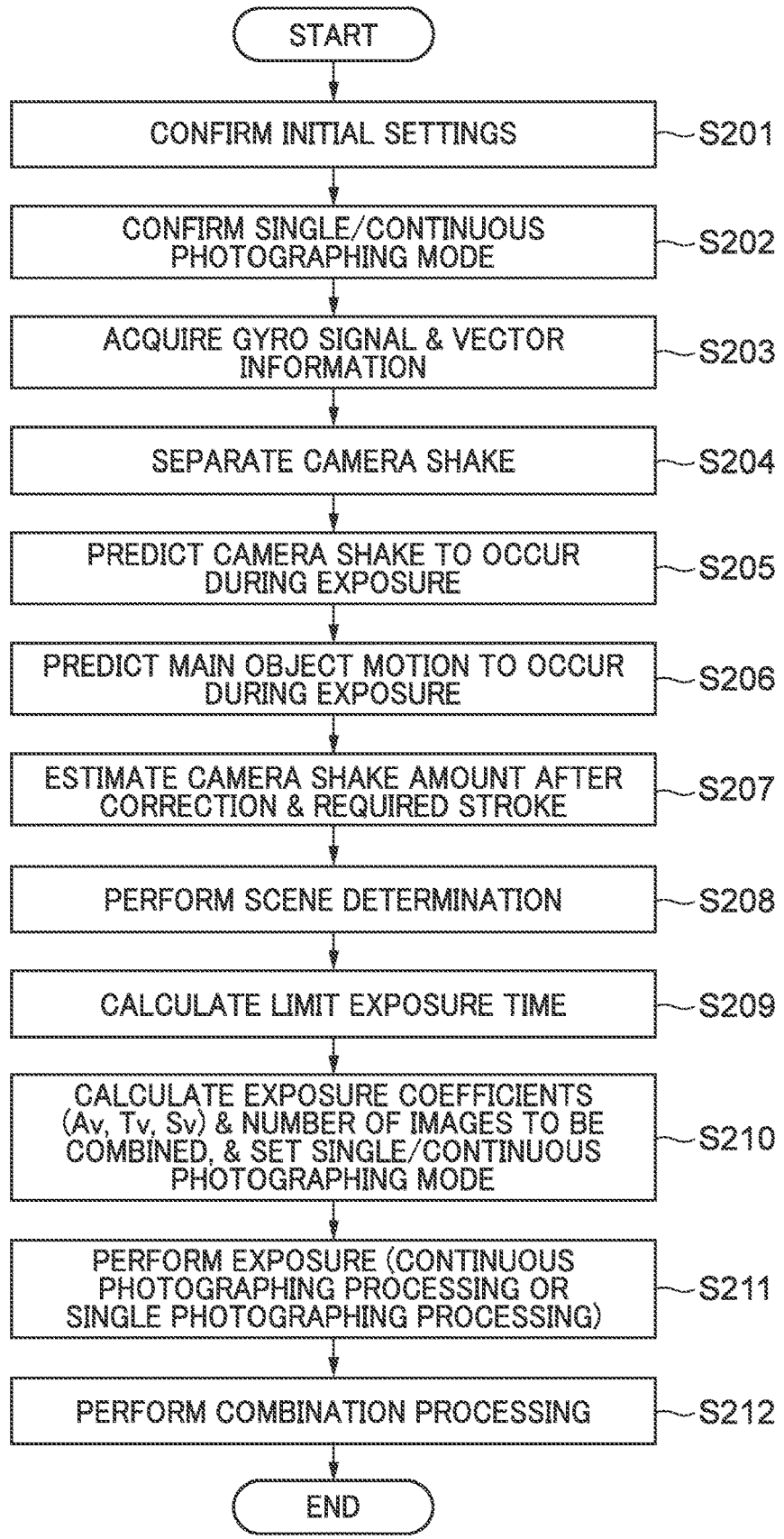
FIG. 2 is a flowchart of an exposure control process.

FIG. 2 is a flowchart of an exposure control process. This process is realized by the CPU 15 that loads an associated program stored in the EEPROM 19 into the RAM, not shown, included in the CPU 15 and executes the loaded program. This process is started when the single or continuous photographing mode is set. In this process, the CPU 15 functions as a first acquisition unit, a second acquisition unit, and a control unit.

In a step S201, the CPU 15 performs processing operations, such as initialization of variables used in this process and moving of driving members to the initial positions, and confirms the initial settings of the interchangeable lens, the photographing mode, and so forth. The CPU 15 determines whether or not an interchangeable lens has been attached, and in a case where the interchangeable lens has been attached, the CPU 15 acquires information concerning the shake correction lens, focus lens, and diaphragm of the interchangeable lens. In a case where the interchangeable lens has not been attached, the CPU 15 does not acquire information on the interchangeable lens. Further, the CPU 15 confirms an operation status of the photographing mode-setting dial of the operation switch 18 and confirms the set photographing mode (such as a shutter speed priority mode, an aperture priority mode, a sport mode, or a scenery mode).

In a step S202, the CPU 15 confirms a state of the continuous photographing mode-setting switch on the operation switch 18 as a setting unit and confirms the setting of the single/continuous photographing mode. That is, the CPU 15 confirms which of a single photographing mode, the very high-speed continuous photographing mode, the high-speed continuous photographing mode, the low-speed continuous photographing mode, and a continuous/single photographing automatic setting mode is set. The very high-speed continuous photographing mode is a special continuous photographing mode in which the sensor readout speed is increased, which is a mode in which a more number of channels are operated in parallel so as to make the driving frequency higher than in normal readout.

In this very high-speed continuous photographing mode, it is possible to suppress motion distortion of an object without operating a mechanical shutter. Since the mechanical shutter operation is not required, more images can be photographed per unit time than when the mechanical shutter is operated. Note that in general, in the very high-speed continuous photographing mode, the shutter speed is made high sometimes by limiting the number of readout bits and limiting a readout range in an OB (optical black) area, and the like, and hence the very high-speed continuous photographing mode is not always set for normal photographing.

In a step S203, the CPU 15 receives motion vector information of each divided area in a predetermined time period from the motion vector detection section 27. Further, the CPU 15 receives detection-processed signals associated with each of the axes of pitch, yaw, and roll in the predetermined time period (gyro signals after integration) from the shake detection section 13. Note that the predetermined time period mentioned here refers to a predetermined time period before the start of photographing, which is a time period from several seconds before the information receiving time (such as a time at which the SW1 is turned on) to the information receiving time.

In a step S204, the CPU 15 executes a camera shake-separating process. The CPU 15 divides the motion vectors in the input image into background vectors each indicating a motion of the background and object vectors each indicating a motion of the object. Therefore, the CPU 15 can acquire the object vectors by separating the background vectors from the motion vectors in the input image. Although this camera shake-separating process will be described in detail with reference to FIGS. 3 and 4, the outline will be simply described here.

The motion vector information is information in which a motion vector generated by a hand shake of a photographer and a motion vector generated by a motion of the object within the screen are combined, and hence it is necessary to separate these motion vectors. Further, the gyro signal has a fluctuation of a signal, such as offset and drift, and due to filter processing, the reliability of a relatively high-frequency signal is higher than that of a motion vector, but the reliability of a relatively low-frequency signal is lower than that of the motion vector. In view of this, the CPU 15 generates a signal having high reliability in a range from the low frequency to the high frequency, using both of the motion vector and the gyro signal. The CPU 15 compares the separated camera-shake vector and the detection-processed signal (gyro signal after integration) obtained from the shake detection section 13 to determine a camera-shake signal (camera-shake information) by eliminating the fluctuation components from the gyro signal. This makes it possible to generate a camera-shake signal having a high reliability and less fluctuation, from which the object motion is separated. Note that although in the present embodiment, it is estimated that a blur generated due to a motion of the image capturing apparatus 100 is mainly caused by a hand shake of a user when the user performs photographing in a state holding the image capturing apparatus 100 by hand, and the camera-shake information is obtained as the shake information, this is not limitative. For example, even in a state in which the camera is fixed or the user stands still, the image capturing apparatus 100 itself sometimes moves due to an external factor, and the above-mentioned shake information is not limited to the information generated due to a hand shake.

In a step S205, the CPU 15 predicts a camera shake to occur during exposure (in a case where continuous photographing is performed, during a time period from the start of first photographing to the end of final photographing; the same applies hereafter). The CPU 15 analyzes the frequency of the camera-shake signals generated in the predetermined time period before the start of photographing, which are obtained in the step S204, to thereby predict a frequency and an amount of a camera shake to occur during exposure, for each frequency. The method of predicting a camera shake will be described hereinafter with reference to FIG. 5.

In a step S206, the CPU 15 predicts motion of the main object to occur during exposure. First, the main object detection section 26 receives the detected motion vectors of the main object area from the motion vector detection section 27. The CPU 15 analyzes the frequency of the motion vector information obtained in the predetermined time period before the start of the photographing to thereby predict a generation frequency and an amount of motion of the main object, which is to occur during exposure, for each frequency. The method of predicting motion of the main object will be described hereinafter with reference to FIG. 6.

In a step S207, the CPU 15 calculates a camera shake amount during exposure after correction, from the camera shake predicted in the step S205. This is calculated from the response characteristics of the shake correction lens 32 and a sensor driving system for shake correction, vibration suppression performance determined from the frequency characteristics of a filter processing system when determining a shake correction amount, and the predicted camera shake. The camera shake amount after correction for each frequency is determined from the predicted camera shake for each frequency and the vibration suppression performance for each frequency, and hence the camera shake amount after correction is determined by calculating the square sum root value after adding the camera shake amount after correction for each axial direction. Then, the CPU 15 determines a stroke of the shake correction lens 32 and the sensor driving system for shake correction, which is required for this correction.

In a step S208, the CPU 15 executes the AF processing and the AE processing. Then, the CPU 15 performs scene determination based on the distance information and the brightness information of the object, which are obtained by the AF processing and the AE processing, and further, the information on the main object, which is received from the main object detection section 26. In the scene determination, the CPU 15 determines which of first, second, and third scenes, described below, corresponds to the scene.

First, the first scene corresponds to a case where the main object is a person, a pet, such as a dog and a cat, and a vehicle, and a value of the motion vector is equal to or larger than a predetermined value, and a case where it is determined from the AF information that an object is moving in a distance direction. Further, the first scene also corresponds to a case where the photographing mode is set to the sport mode or a kids & pet mode. In this case, there is a high possibility that motion of the object is small before photographing but large motion is caused by some trigger. The first scene also corresponds to a case where macro photographing (determined from the focal length and the AF information) is performed. For the first scene, it is desirable to set the very high-speed continuous photographing mode or the like. In the present embodiment, the very high-speed continuous photographing mode is basically set for the first scene.

The second scene correspond to a case where even when the main object is a person, a pet, such as a dog and cat, and a vehicle, a value of the motion vector is smaller than the predetermined value and the main object is distant from the image capturing apparatus 100, and a case where the main object is another thing, such as a still life, and a value of the motion vector is smaller than the predetermined value. Further, the second scene also corresponds to a case where the photographing mode is set to the scenery mode. In this case, there is a high possibility that even when an object is moving before photographing, the object is not the main object. In the second scene, the very high-speed continuous photographing is not required, and the low-speed continuous photographing is sometimes preferable from a viewpoint of energy saving. In the present embodiment, the high-speed continuous photographing mode is basically set for the second scene.

The third scene correspond to a night scenery in which the brightness determined from the AE information is lower than a predetermined value and an object is not moving, and a case where it is determined from the color temperature information and the AE information that photographing is being performed on the morning sun/setting sun in which the brightness obtained is partially very high but is lower than a predetermined value in its entirety. In the third scene, the exposure time period is long, and hence the low-speed continuous photographing in which the photographing interval is long and centering of the correction system is possible is preferable. This makes it possible to perform shake correction during the long exposure time period. In the present embodiment, the low-speed continuous photographing mode is basically set for the third scene.

In a step S209, the CPU 15 calculates a limit exposure time TvLMT which is the longest exposure time, based on the magnitude of motion of the object, by using an expression (1) or (2) described below. The limit exposure time TvLMT is a limit value of the exposure time which can be set on the longer side. In a case where the object motion is equal to or larger than a predetermined value, the exposure time Tv is set to a time period over which no object blur is caused. Therefore, the CPU 15 calculates the limit exposure time TvLMT by the expression (1). The exposure time TvLMT is e.g. a maximum value satisfying the expression (1):

$$\text{Exposure time TvLMT} \leq \text{length of one side of one pixel} \div \text{object motion speed (µm/second)} \quad (1)$$

In the above expression, the object motion speed is a value at a frequency at which the main object motion amount for each frequency, which is predicted in the step S206 to occur during exposure, is the maximum. Alternatively, at a plurality of representative frequencies, a product sum of the object motion speed for each of the frequencies and the generation frequency may be set as the object motion speed.

Further, in a case where the object motion is smaller than the predetermined value, the CPU 15 estimates a camera shake amount after correction and controls the exposure time Tv, the ISO sensitivity Sv, and the aperture value Av. For this control, the CPU 15 calculates the limit exposure time TvLMT by the expression (2). The limit exposure time TvLMT is e.g. a maximum value satisfying the expression (2):

$$\text{Exposure time TvLMT} \leq \text{length of one side of one pixel} \div \text{camera shake amount after correction (μm/second)} \quad (2)$$

Here, in a case where the actual stroke of the correction system is insufficient to the stroke of the shake correction system determined in the step S207, the CPU 15 may determine the limit exposure time TvLMT as follows: The CPU 15 compares the exposure time in which the camera shake amount predicted in the step S205 becomes a predetermined ratio (such as 80%) of the actual stroke of the correction system and the result of calculation by the above expression (2), and determines the shorter one as the limit exposure time TvLMT.

The camera shake amount after correction used here is an amount calculated in the step S207 from the camera shake amount after correction. The value calculated in the step S207 expresses a sum of amplitudes of the waveform of the camera shake amount at each frequency. Therefore, it is possible to simply consider that a product obtained by multiplying the sum by the exposure time is the camera shake amount after correction, which is to occur during exposure under the most unfavorable conditions (however, the camera shake is a periodic wave and hence the maximum value is a value calculated in the step S207). Strictly speaking, although it is necessary to perform calculation by determining the exposure start/end times from a waveform formed by additionally combining the camera-shake signals of the respective frequencies, the above-described simple method can be used to determine the limit exposure time TvLMT.

In a step S210, the CPU 15 calculates the exposure coefficients and the number of images to be combined, and further, selects between single photographing and continuous photographing and a type of the continuous photographing mode in a case where the continuous photographing is selected. Details of these will be described with reference to FIGS. 6 and 7.

In a step S211, the CPU 15 executes exposure processing according to the set photographing mode (including continuous photographing processing or single photographing processing). For example, when the CPU 15 confirms that the SW1 of the release switch is turned on, the CPU 15 drives the focus lens 33 to the in-focus position based on a result of the AF processing and controls the exposure time, the aperture value, and so forth, based on results of the calculation and setting in the step S210. In doing this, the CPU 15 also performs the shake correction processing. To this processing, known shake correction processing in photographing or the like can be applied. Then, when the SW2 is turned on, the CPU 15 executes actual exposure processing. In a case where continuous photographing is performed, the exposure processing is performed the number of times corresponding to the number of images to be combined.

In a step S212, in a case where continuous photographing is performed, the CPU 15 performs shake correction by performing combination processing, followed by terminating the process in FIG. 2. Note that in a case where single photographing is performed, the CPU 15 terminates the process in FIG. 2 without performing combination processing.

In the combination processing, the CPU 15 controls the motion vector detection section 27 to detect a positional shift between a plurality of images input from the analog-to-digital converter 5 and controls the image deformation and cutout section 28 to geometrically deform the image so as to correct the positional shift. In this geometric deformation, the positional shifts of the image in the translational and rotational directions are corrected by applying affine transformation or projective transformation to the image. In the geometric deformation, it is necessary to associate the respective pixels between images before and after deformation. In a case where the image is translationally or rotationally moved in units of subpixels, the pixels are not associated with each other in one-to-one relation, and hence it is general to associate the pixels using pixels each interpolated by a plurality of peripheral pixels. However, if this pixel interpolation is performed, the resolution of the image is degraded, which causes image quality degradation. To prevent image quality degradation, it is desirable not to translationally or rotationally move the image in units of subpixels as much as possible. By limiting the translational motion of the image to motion of the image in units of integer pixels, image quality degradation caused by pixel interpolation is suppressed, though the accuracy of position alignment is reduced. Then, the image combining section 29 adds up the plurality of images whose positions have been aligned by geometric deformation. As a result, shake correction using image combination is realized.

Figure 3:
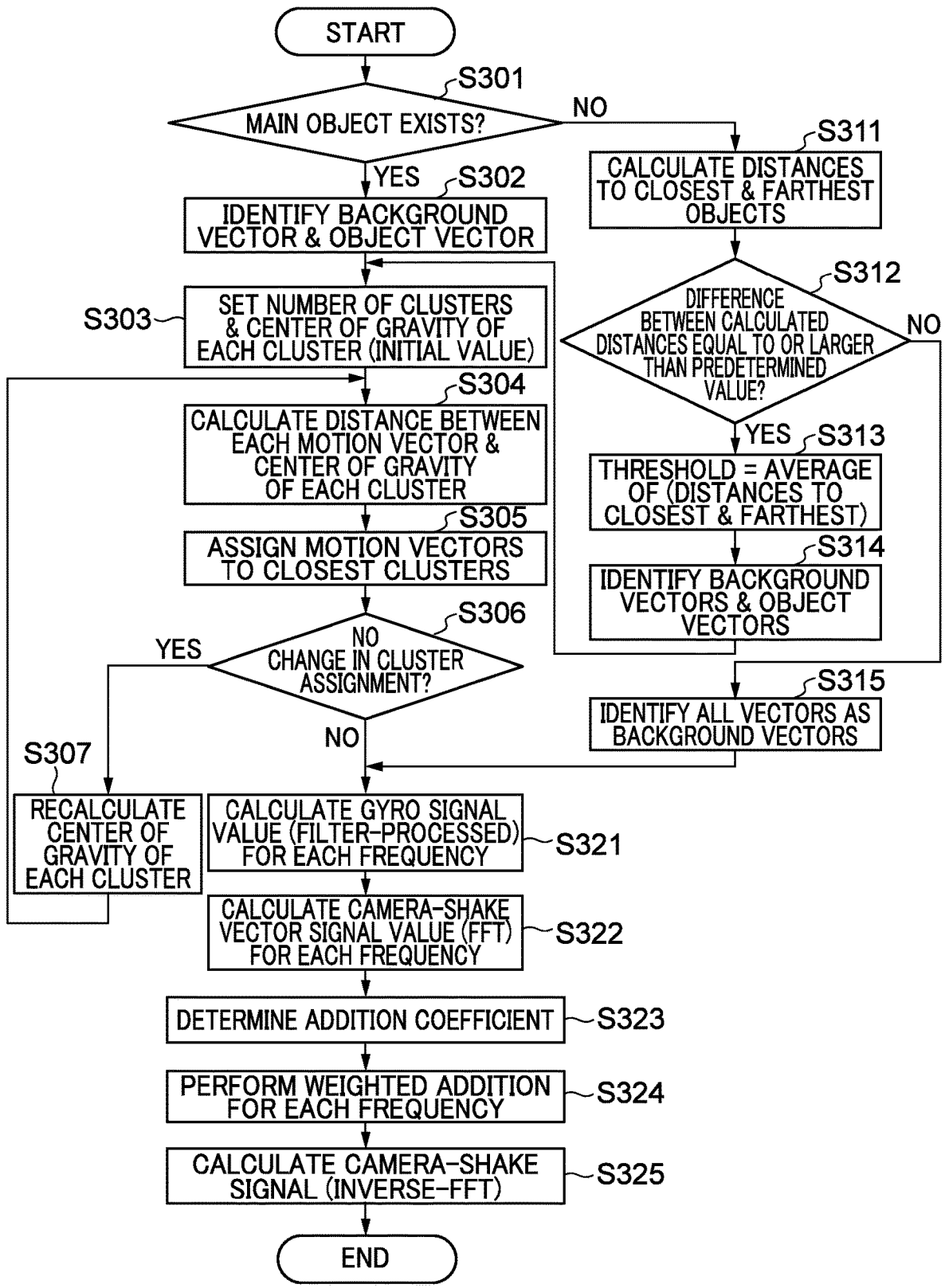
FIG. 3 is a flowchart of a camera shake-separating process.

FIG. 3 is a flowchart of a camera shake-separating process executed in the step S204 in FIG. 2. In this process, there will be described separation of camera-shake vectors by clustering, and generation of a camera-shake signal having high reliability without fluctuation. The "clustering" here refers to grouping of motion vectors performed such that, among a plurality of motion vectors, one or two or more motion vectors each having a similar direction and size (for example, differences in direction and size between the motion vectors are equal to or less than respective predetermined values) belong to one group. One group is referred to as a cluster in the following description.

In a step S301, the CPU 15 determines whether or not there is a main object, i.e. whether or not a main object has been detected by the main object detection section 26. If there is a main object, the CPU 15 proceeds to a step S302, whereas if not, the CPU proceeds to a step S311.

In the step S302, the CPU 15 performs first separation processing using the main object information obtained from the main object detection section 26. In this first separation processing, the CPU 15 identifies motion vectors detected at respective points belonging to the outside of the object area as background vectors, and identifies motion vectors detected at respective points belonging to the inside of the object area as object vectors. After execution of the step S302, the CPU 15 proceeds to a step S303.

In the step S311, the CPU 15 calculates a distance to a farthest object and a distance to a closest object within the image. In a step S312, the CPU 15 determines whether or not a difference between these two distances is equal to or larger than a predetermined value. If the difference between the two distances is smaller than the predetermined value, the CPU 15 regards all the vectors as the background vectors in a step S315, and proceeds to a step S321. On the other hand, if the difference between the two distances is equal to or larger than the predetermined value, the CPU 15 calculates a threshold value in a step S313. Note that this threshold value is set to e.g. an average value of the distance to the farthest object and the distance to the closest object. In a step S314, the CPU 15 performs the first separation processing for identifying motion vectors detected in an area not closer than the above-mentioned threshold value as the background vectors, and identifying motion vectors detected in an area closer than the above-mentioned threshold value as the object vectors. Then, the CPU 15 proceeds to the step S303.

In the step S303 et seq., to improve the separation accuracy, the CPU 15 performs "separation based on amounts of motion vectors" using the known k-means method, as second separation processing.

First, in the step S303, the CPU 15 sets the number k of clusters to be classified and an initial value Vk of the center of gravity of each cluster. Note that the number k of clusters is set to 2 (i.e. k=2) because the clusters are separated into a background cluster and an object cluster this time. In a case where a plurality of objects for photographing exist, the number of clusters may be changed according to the number of objects. Further, a cluster for separating a motion vector group which belongs neither to the background nor to the object may be provided.

As for the initial value of the center of gravity of each cluster, the result of the first separation processing is used. More specifically, the CPU 15 generates histograms using a motion amount in the X direction and a motion amount in the Y direction, respectively, with respect to the background vector obtained by the first separation processing and determines the most frequent values V1x and V1y of the respective histograms. These most frequent values are representative values of the background vector, and hence the CPU 15 sets these values to the initial values V1=(V1x, V1y) of the center of gravity of the background cluster. By using the same method, the CPU 15 determines the representative values V2x and V2y of the object vector obtained by the first separation processing and sets the values to the initial values V2=(V2x, V2y) of the center of gravity of the object cluster.

In a step S304, the CPU 15 calculates a distance between each motion vector and the center of gravity of each cluster. Then, in a step S305, the CPU 15 reassigns motion vectors to the clusters by regarding each motion vector data item as data belonging to a cluster positioned at the closest distance.

In the above-described processing, in a case where there is no change in assignment of all vector data to the clusters, or in a case where the amount of change is smaller than a predetermined threshold value set in advance, the CPU 15 determines that the processing has converged. Then, the CPU 15 terminates the second separation processing, and proceeds from the step S306 to the step S321. The background vectors determined as described above are camera-shake vectors.

On the other hand, in a case where it cannot be determined that the processing has converged, the CPU 15 proceeds to a step S307, wherein the CPU 15 recalculates the center of gravity of each cluster from the newly assigned cluster, and then returns to the step S304. Therefore, the CPU 15 repeats the processing for calculating a distance between each motion vector data and the center of gravity of each cluster, and performing assignment of the motion vectors to the clusters again.

In the step S321, the CPU 15 calculates a gyro signal value for each frequency e.g. by applying Fourier transformation to the filter-processed gyro signals obtained in the step S203. In a step S322, the CPU 15 calculates a camera-shake vector signal value for each frequency e.g. by applying Fourier transformation to the signals obtained by processing up to the step S306.

Note that the bandwidth of the camera-shake vector signal value obtained by conversion to a frequency range is approximately 0 to 15 Hz. This is because sampling of the digital image signals input to the motion vector detection section 27 is performed at approximately 30 fps. On the other hand, the bandwidth of the gyro signal value is approximately 0 to 100 Hz. The frequency corresponding to the sampling period of the gyro signal value is approximately 600 Hz for the three axes of pitch, yaw axis, and roll, and hence the bandwidth of the gyro signal value of one axis becomes the above-mentioned value. Therefore, the CPU 15 sets part of the camera-shake vector signal values exceeding 15 Hz to 0 for convenience sake.

Figure 4:
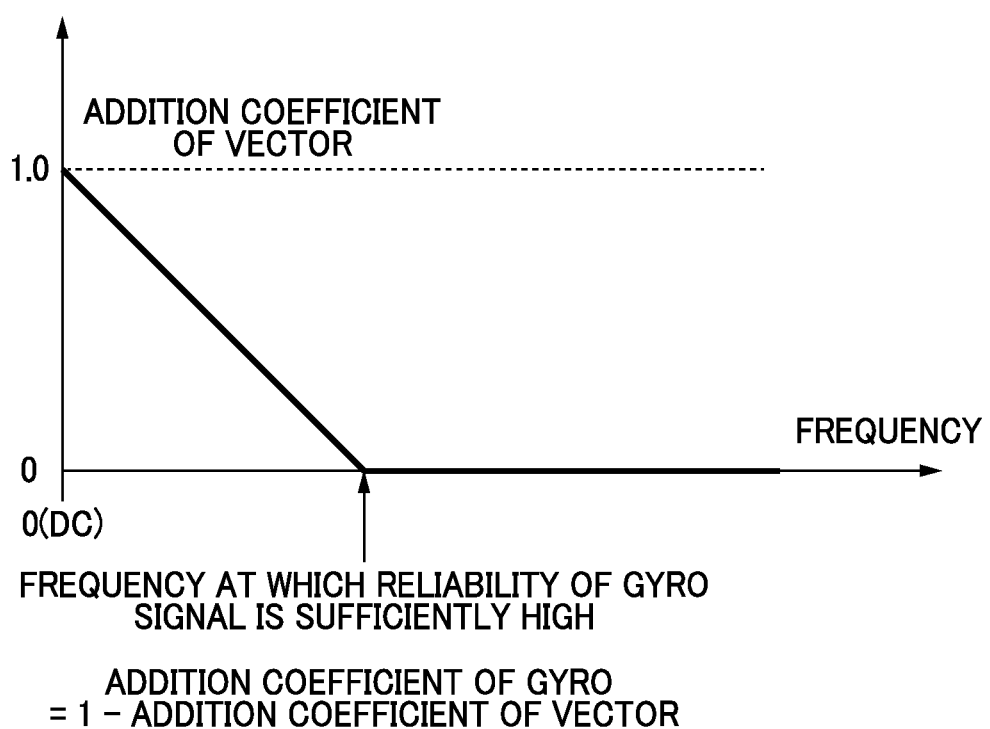
FIG. 4 is a table showing a relationship between a frequency and an addition coefficient of a camera-shake vector signal value.

In a step S323, the CPU 15 determines an addition coefficient used when weighting and adding both of the gyro signal value and the camera-shake vector signal value for each frequency. The CPU 15 determines the addition coefficient according to a table shown in FIG. 4 such that the value is larger in each frequency band having higher reliability. FIG. 4 is the table showing a relationship between the frequency and the addition coefficient of the camera-shake vector signal value. The addition coefficient of the camera-shake vector signal value is equal to 1.0 at a frequency of 0 Hz (DC), and is equal to 0 at a frequency at which the reliability of the gyro signal value is sufficiently high, or higher, and at a frequency between these frequencies, the addition coefficient has a value determined by linear interpolation. The addition coefficient of the gyro signal value is a value obtained by subtracting the addition coefficient of the camera-shake vector signal value from 1.

In a step S324, the CPU 15 adds the gyro signal value and the camera-shake vector signal value for each frequency using the addition coefficient determined in the step S323. In a step S325, the CPU 15 generates a camera-shake signal by performing inverse-Fourier transformation, followed by terminating the process in FIG. 3. Thus, the CPU 15 can acquire the camera-shake signal based on the background vectors separated from the motion vectors in the input image and the gyro signal output from the shake detection sensor 14.

Next, prediction of a camera shake to occur during exposure, which is executed in the step S205, and prediction of motion of the main object to occur during exposure, which is executed in the step S206, will be described with reference to FIGS. 5A to 5C.

Figure 5A:
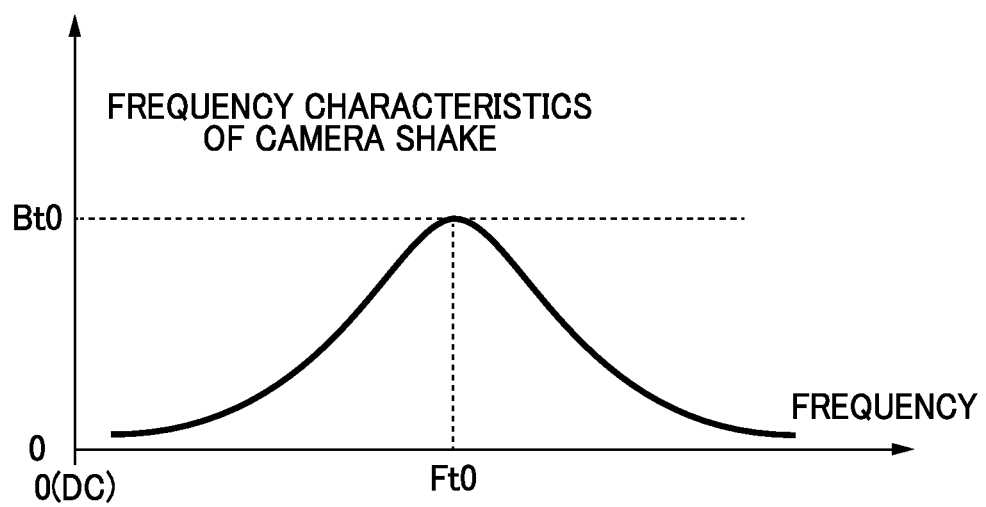
FIGS. 5A to 5C are diagrams showing results of analysis of the frequencies of a camera-shake signal and a motion vector, which are generated in a predetermined time period before the start of photographing.
Figure 5B:
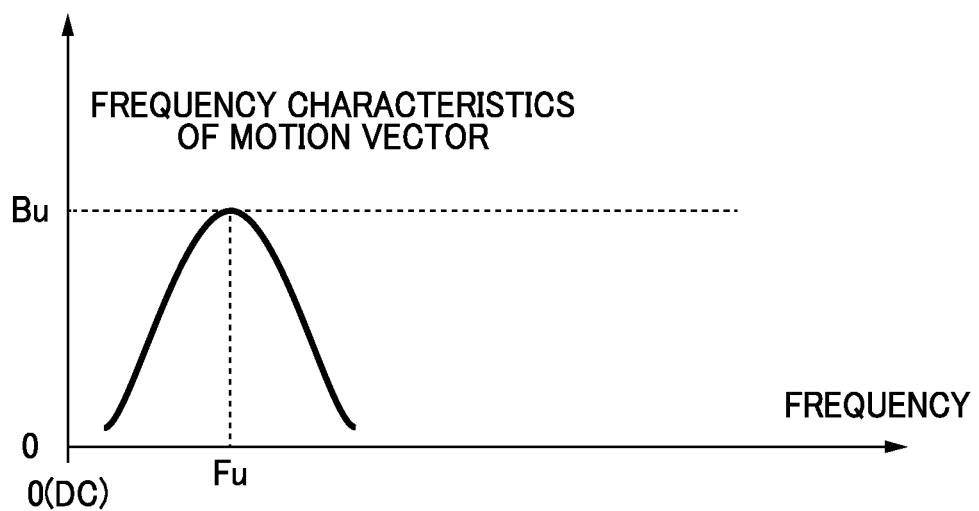
Figure 5C:
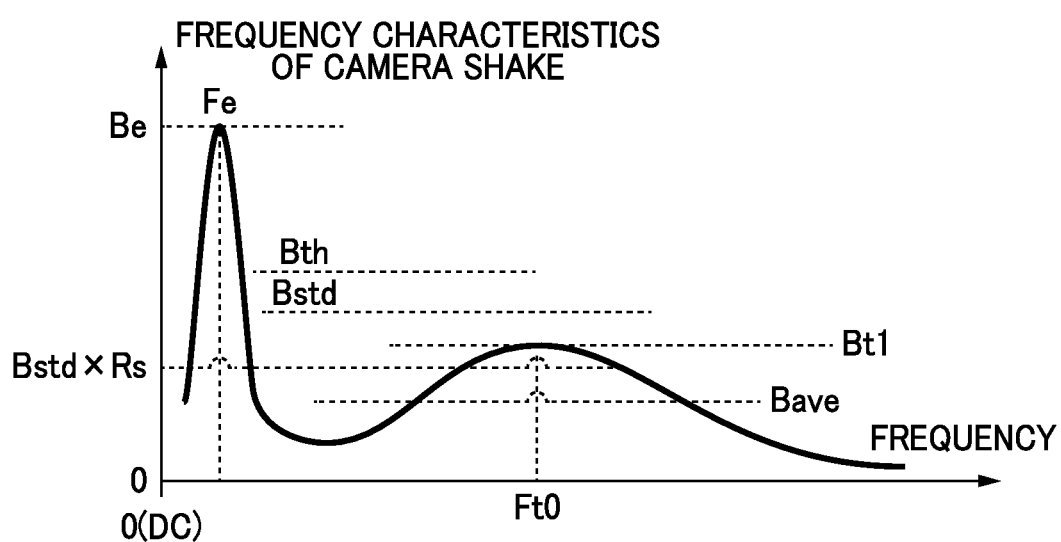

FIGS. 5A and 5C are diagrams each showing a result of analysis (such as result of Fourier transformation) on the frequency of the camera-shake signals generated in the predetermined time period before the start of photographing. FIG. 5B is a diagram showing a result of analysis on the frequency of the motion vectors generated in the predetermined time period before the start of photographing. These frequency analysis operations are performed in the steps S321 and S322.

The frequency distribution of the motion vectors generally exists on a low-frequency side, compared with the frequency distribution of the camera shake. FIGS. 5A and 5B show this state. Further, in FIG. 5C, a large signal value other than the normal camera shake exists on a lower frequency side than the normal camera shake. This is caused by moving of the image capturing apparatus in order to perform framing again or confirm the settings. This signal value is never generated during exposure, and hence it is necessary to eliminate the influence of the signal value.

Then, the CPU 15 calculates a maximum value Bmax of the signal value obtained from the result of frequency analysis and an average value Bave of signal values of the respective frequencies, obtained as the result of frequency analysis. Then, if Bmax<Bave×Cs holds, the CPU 15 selects a frequency having a camera-shake signal value equal to or larger than Bmax×Rs as a predicted value of the camera shake to occur during exposure. Note that Cs and Rs are constants. On the other hand, if Bmax≥Bave×Cs holds, the CPU 15 selects a frequency having a camera-shake signal value equal to or larger than Bstd (corresponding to the maximum value near Bave)×Rs and smaller than Bstd.

Assuming that an average value (Bth) of values equal to or larger than Bave is set as a threshold value, this Bstd is an average value of values not larger than the threshold value and equal to or larger than Bave. Note that this constant Cs is only required to be set to a value of approximately 3 to 4 by considering e.g. the properties of a normal distribution function. Further, the constant Rs is only required to be set to a value of approximately 0.5. A predicted value of motion of the main object to occur during exposure can also be determined in the same manner.

Here, an example of the signal value will be described. To the maximum value Bmax of the camera-shake signal value, a signal value Bt0 at a frequency Ft0 corresponds in FIG. 5A, and a signal value Be at a frequency Fe corresponds in FIG. 5C. In the case shown FIG. 5A, since the maximum value Bmax is equal to Bt0, and the average value Bave is equal to a value corresponding to 50% of Bt0, and hence Bmax<Bave×Cs holds. Therefore, a frequency having a camera-shake signal value equal to or larger than Bmax×Rs is selected. That is, a frequency near the frequency Ft0 in FIG. 5A is selected.

In the case shown FIG. 5C, since the maximum value Bmax is equal to Be, and the average value Bave is equal to a value corresponding to 20% of Be, and hence Bmax≥Bave×Cs holds. Therefore, the CPU 15 performs processing for selecting a frequency band from the maximum value near Bave.

To determine Bstd, the CPU 15, first, calculates an average value Bth of values equal to or larger than Bave and sets the calculated value as a threshold value. Then, the CPU 15 calculates an average value of signals values equal to or smaller than this threshold value and equal to or larger than Bave and sets the calculated value as Bstd. Then, the CPU 15 selects a frequency having a camera-shake signal value equal to or larger than Bstd×Rs and smaller than Bstd. Here, a frequency corresponding to the signal value Bt1 or thereabout in FIG. 5C is selected.

To the maximum value of the motion signal values of the main object, a signal value Bu at a frequency Fu corresponds in FIG. 5B. In this case, the maximum value Bmax is equal to Bu, and the average value Bave is a value corresponding to 50% of Bu, and hence Bmax<Bave×Cs holds. Therefore, the CPU 15 selects a frequency having a camera-shake signal value equal to or larger than Bmax×Rs. Here, a frequency near the frequency Fu in FIG. 5B is selected.

Thus, it is predicted that the main object moves at the selected frequency. In this prediction result, a camera shake and an object shake are taken into consideration. Note that although in the description given with reference to FIGS. 5A to 5C, the values of the frequency are limited for simplifying calculation, all converted frequencies may be set as targets of calculation.

Next, the process for calculating the exposure coefficients and the number of images to be combined and selecting between the single photographing mode and the continuous photographing mode, which are executed in the step S210, will be described with reference to FIGS. 6 and 7.

Figure 6:
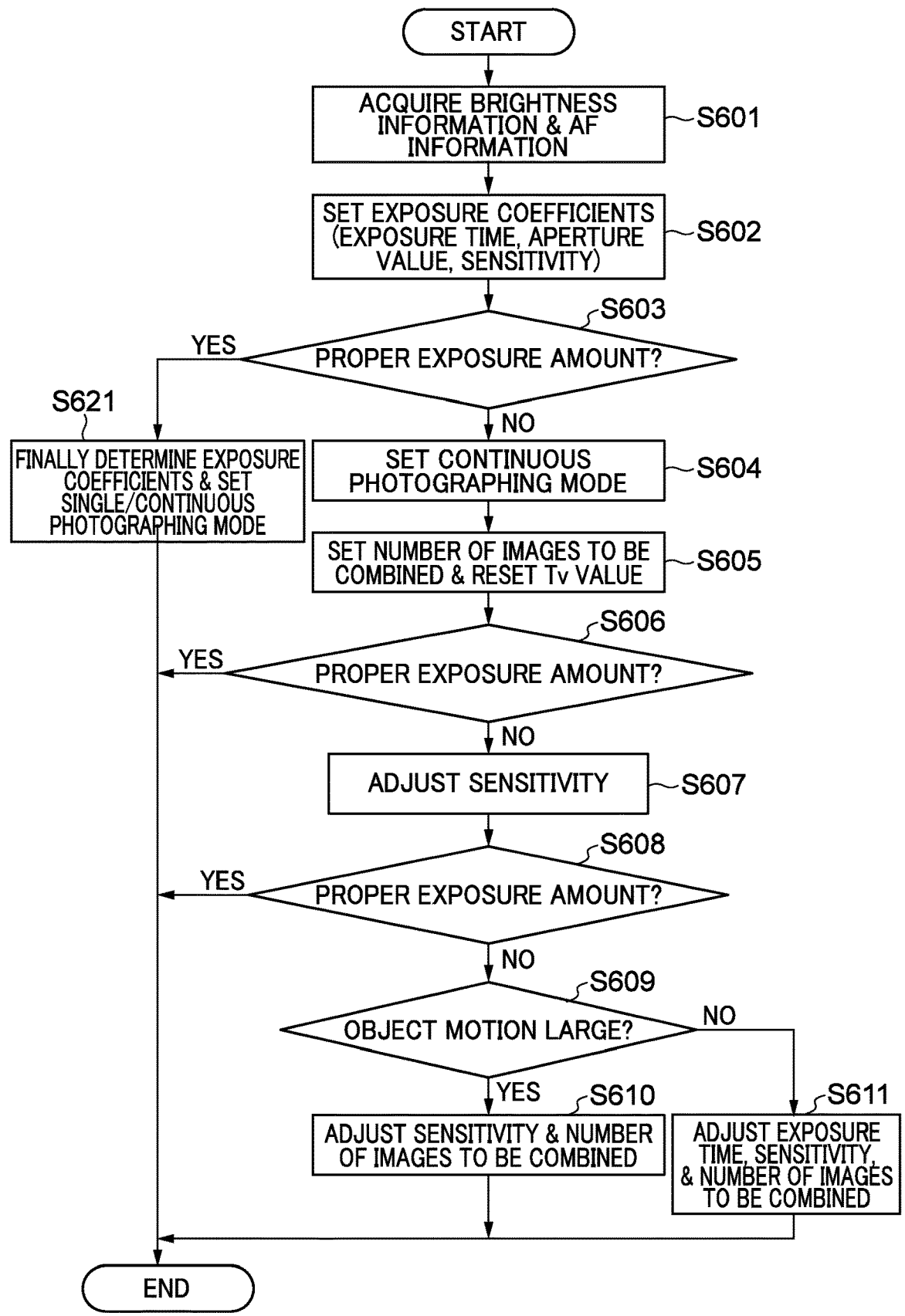
FIG. 6 is a flowchart of a process for calculating exposure coefficients and the number of images to be combined and selecting between single and continuous photographing modes.

FIG. 6 is a flowchart of the process for calculating the exposure coefficients and the number of image to be combined and selecting between the single photographing mode and the continuous photographing mode. FIG. 7 is an example of a program diagram used in the process in FIG. 6.

In a step S601, the CPU 15 acquires results of the AE processing and the AF processing which are executed in the step S208. In a step S602, the CPU 15 sets the three exposure coefficients according to the program diagram shown in FIG. 7. On this program diagram, the limit exposure time TvLMT which has already been set in the step S209 is reflected.

Figure 7:
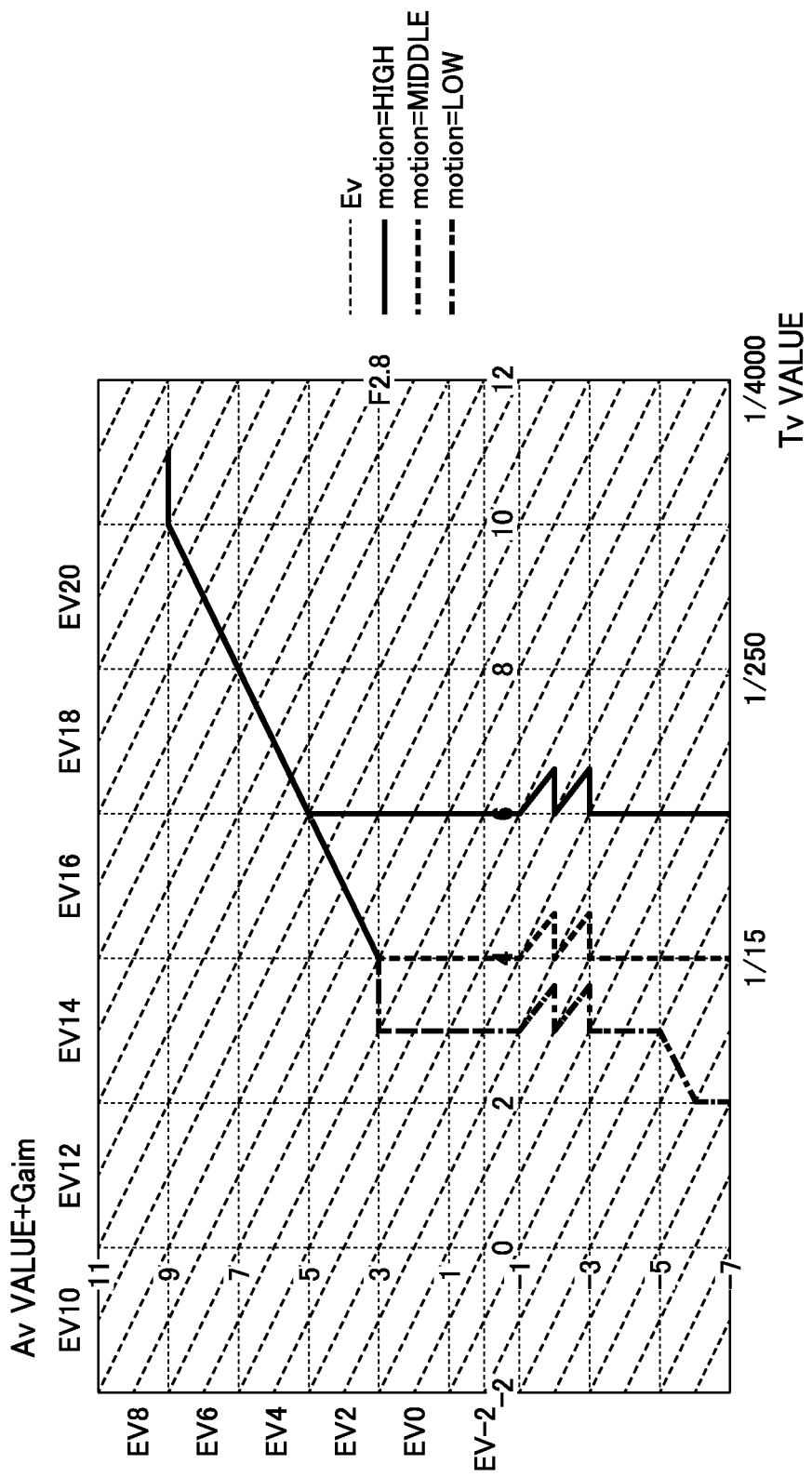
FIG. 7 is an example of a program diagram.

Referring to FIG. 7, a solid line is a program line used in a case where the object motion is large (larger than a first predetermined value), a broken line is a program line used in a case where the object motion is medium (smaller than the first predetermined value and equal to or larger than a second predetermined value), and a one-dot-chain line is a program line used in a case where there is no object motion (smaller than the second predetermined value). Here, the case where the object motion is large is a case where the object is determined as an object which is moving fast, such as a running person or a vehicle. The case where the object motion is medium is a case where the object is determined as an object which is slowly moving, such as a walking person or a pet. The case where there is no object motion is a case where the object is determined as a person who stands still or as a still life.

In the program diagram shown in FIG. 7, the exposure time Tv is shorter in a case where the object motion is a second motion larger than a first motion (for example, a case where the object motion is larger than the first predetermined value) compared with a case where the object motion is the first motion (for example, a case where the object motion is smaller than the second predetermined value).

In the step S602, in a case where it is determined that the object is moving, the CPU 15 proceeds from the step S602 to a step S603. On the other hand, in a case where it is determined that the object is not moving, the CPU 15 evaluates an influence of a shift shake.

More specifically, the CPU 15 detects a photographing distance (object distance) from the result of the AF processing and estimates a degree of generation of a shift shake and a degree of shift shake correction performance, based on the detected distance and the focal length of the focus lens 33. Then, the CPU 15 changes the limit exposure time TvLMT to the short-time side according to an estimation result. That is, the CPU 15 estimates a shake amount after correction to occur during exposure, and recalculates the limit exposure time TvLMT based on the estimated shake amount.

The shift shake correction performance at each photographing distance is estimated from a stroke of the sensor driving system for shake correction, which is necessary for camera shake correction and determined in the step S207, and the frequency characteristics. The shift shake is corrected by the sensor driving system. Therefore, the shift shake correction performance is determined according to how much an actual margin of the stroke of the sensor driving system is left with respect to the necessary stroke, the response characteristics of the sensor driving system in a low frequency band (such as a frequency not higher than 0.5 Hz), and the frequency characteristics of the filter processing system.

The low-frequency response characteristics have no large delay and the shift shake is mostly generated in the low frequency band, and hence if the stroke of the sensor diving system has a sufficient margin, it is predicted that a large amount can be corrected. Therefore, an insufficient amount of the stroke of the sensor driving system corresponds to most part of the shift shake which is not corrected. More specifically, the shift shake which is not corrected is calculated by an expression (3):

$$\text{Uncorrected shift shake} = \text{insufficient stroke amount} + \text{Rsb} \times \text{stroke margin} \quad (3)$$

wherein Rsb is a constant of approximately 0.1.

Then, the CPU 15 recalculates the limit exposure time TvLMT using the camera shake amount after correction to occur during exposure and the uncorrected shift shake. As a result, in a case where the exposure time Tv has been changed, the CPU 15 calculates the aperture value Av according to the shift amount in the optical axis direction (optical axis direction shake amount). More specifically, the CPU 15 detects an amount by which the image capturing apparatus 100 has been moved in the optical axis direction from the result of the AF processing executed in the step S208, and determines the aperture value Av such that the farthest distance and the closest distance are included within the depth of field. In doing this, by taking a measurement error into consideration, extreme values (for example, values outside a range determined by a standard deviation value and an average value which are calculated) may be excluded.

In a case where the aperture value has been changed from the aperture value Av initially set, the CPU 15 adjusts the ISO sensitivity according to the changed amount. For example, if the aperture value Av is narrowed by one stop, the CPU 15 increases the ISO sensitivity by an amount corresponding to the one stop to adjust the ISO sensitivity. In a case where the exposure time Tv has been changed by taking an influence of shift shake into consideration, the CPU 15 adjusts the ISO sensitivity by an amount which covers not only the change of the aperture value Av but also the change of the exposure time Tv. However, in all of the above-mentioned cases, an upper limit sensitivity is set for an initial value of the ISO sensitivity, and if the adjusted sensitivity exceeds the upper limit sensitivity, the ISO sensitivity is clipped to the upper limit sensitivity.

After that, in the step S603, the CPU 15 determines whether or not a proper exposure amount can be obtained using the set exposure coefficients. If it is determined that a proper exposure amount can be obtained, the CPU 15 proceeds to a step S621, whereas if it is determined that the proper exposure amount cannot be obtained, the CPU 15 proceeds to a step S604.

In the step S621, in a case where the photographer has not set the continuous photographing mode, the CPU 15 finally determines the exposure coefficients and sets the single photographing mode with the determined exposure coefficients. Therefore, in this case, it is determined not to perform image combination. On the other hand, in a case where the photographer has set the continuous photographing mode, the CPU 15 sets the continuous photographing mode (type) according to the setting of the continuous photographing mode. Therefore, in this case, it is determined to perform image combination. After execution of the step S621, the CPU 15 terminates the process in FIG. 6.

In the step S604, the CPU 15 performs the setting of the continuous photographing mode. In a case where the continuous photographing mode setting (very high-speed, high speed, or low speed) has been intentionally made by the photographer, the CPU 15 proceeds to a step S605 without changing the setting of the continuous photographing mode (type).

On the other hand, in a case where the continuous photographing mode setting has not been intentionally made, the CPU 15 sets the continuous photographing mode according to the scene determination in the step S208. With this, it is possible to set the continuous photographing mode of a type suitable for the motion of the object. Note that in doing this, the continuous photographing mode may be set by taking the battery remaining amount or the estimated margin of the correction stroke into consideration. For example, in a case where the battery remaining amount is less than a predetermined remaining amount, the CPU 15 sets the low-speed continuous photographing mode which saves energy, and in a case where the estimated margin of the correction stroke is less, the CPU 15 sets the low-speed continuous photographing mode in which the continuous photographing interval is long and it is possible to perform the centering of the correction system. Note that the estimated margin of the correction stroke can be determined from the camera shake amount during exposure, which is predicted in the step S205, and the positions of the shake correction lens 32 and a sensor driving system element, not shown, for shake correction (amount of deviation from the center) at the time.

After the continuous photographing mode is set, in the step S605 et seq., in a case where a second continuous photographing mode is set, there is performed at least one of processing operations for making the exposure time longer, making the number of images to be combined smaller, and making the ISO sensitivity lower, than in a case where a first continuous photographing mode is set. Here, the second continuous photographing mode is a continuous photographing mode lower in speed than the first continuous photographing mode. For example, in a case where the very high-speed continuous photographing mode is the first continuous photographing mode, the high-speed continuous photographing mode or the low-speed continuous photographing mode corresponds to the second continuous photographing mode. In other words, in a case where a relatively low-speed continuous photographing mode is set, a relatively small number of images to be combined, a relatively long exposure time, and a relatively low ISO sensitivity are set. In a case where a relatively high-speed continuous photographing mode is set, a relatively large number of images to be combined, a relatively short exposure time, and a relatively high ISO sensitivity are set. In this respect, the CPU 15 functions as a control unit of the present invention.

First, in the step S605, the CPU 15 sets the number of images to be combined and resets the exposure time Tv in accordance with the set number of images to be combined. More specifically, the CPU 15 first adjusts the number of images to be combined so as to compensate for insufficiency of the exposure amount obtained with the exposure coefficients set in the step S602. The number of images to be combined is set to a positive integer obtained by the Nc-th power of 2 (Nc is a positive integer) and such that the exposure amount makes proper exposure or overexposure. The upper limit of this Nc is different depending on a continuous photographing mode.

The number of images to be combined has a limit. This is because as the number of images to be combined is larger, the exposure amount of one image is smaller so that the S/N ratio when combining the images becomes lower, and as the number of images to be combined is larger, the accuracy of vector position alignment becomes lower. Further, when the exposure amount is reduced, the accuracy of detection of a shift amount between images in position alignment is lowered, and the number of times of aligning the positions is increased, which causes not only accumulation of minute errors, but also increase the probability that an error occurs in detecting a position alignment amount. In view of this, the upper limit number of images to be combined is set by taking the above into consideration. Let us consider first, second, and third upper limit numbers of images to be combined, as the upper limit number of images to be combined.

The first, second, and third upper limit numbers of images to be combined are associated with the low-speed, high-speed, and very high-speed continuous photographing modes, respectively. The magnitude relationship of the values of Nc is such that the first upper limit number of images to be combined<the second upper limit number of images to be combined<the third upper limit number of images to be combined holds. The value of Nc of the first upper limit number of images to be combined is a value obtained by reducing approximately 3 to 4 stops from the value of Nc of the third upper limit number of images to be combined. The value of Nc of the second upper limit number of images to be combined is a value obtained by reducing approximately 2 to 3 stops from the value Nc of the third upper limit number of images to be combined. In a case where the exposure amount becomes larger than the proper exposure amount due to the set number of images to be combined, the CPU 15 adjusts the exposure amount by changing the exposure time Tv to a shorter time.

In a step S606, the CPU 15 determines whether or not a proper exposure amount can be obtained by the number of images to be combined which is set in the step S605 and the exposure coefficients. If it is determined that a proper exposure amount can be obtained, the CPU 15 finally determines the settings of the exposure coefficients and the continuous photographing mode, followed by terminating the process in FIG. 6. However, if it is determined that a proper exposure amount cannot be obtained, the CPU 15 proceeds to a step S607.

In the step S607, the CPU 15 sets the upper limit sensitivity to a value higher than the above-mentioned upper limit sensitivity of the initial value of the ISO sensitivity. The value of the upper limit sensitivity set in this case is determined according to a type of the continuous photographing mode and the predicted value of motion of the main object to occur during exposure. Then, the CPU 15 adjusts (increases) the ISO sensitivity to a value within the upper limit sensitivity. The upper limit sensitivity is lower in a case where the low-speed continuous photographing mode is set, compared with a case where the high-speed continuous photographing mode is set.

In a step S608, the CPU 15 determines whether or not a proper exposure amount can be obtained as a result of the adjustment of the ISO sensitivity in the step S607. If it is determined that a proper exposure amount can be obtained, the CPU 15 finally determines the settings of the exposure coefficients and the continuous photographing mode, followed by terminating the process in FIG. 6. However, if it is determined that a proper exposure amount cannot be obtained, the CPU 15 proceeds to a step S609.

In the step S609, the CPU 15 determines whether or not the motion of the main object is large, i.e. whether or not the predicted value of the motion of the main object to occur during exposure, is equal to or larger than a predetermined value. Then, if the predicted value of the motion of the main object to occur during exposure is equal to or larger than the predetermined value, the CPU 15 proceeds to a step S610, whereas if not, the CPU 15 proceeds to a step S611.

In the step S610, the CPU 15 adjusts the ISO sensitivity and the number of images to be combined again to thereby obtain a proper exposure amount. For example, the CPU 15 increases the ISO sensitivity by within ½ stop to obtain a proper exposure amount. If the exposure amount is still insufficient in spite of this adjustment, the CPU 15 increases the number of images to be combined to a value within a range up to 1.4 times (to an integer value formed by rounding down decimals) to obtain a proper exposure amount. If the exposure amount is still insufficient, the CPU 15 repeats these operations until a proper exposure amount is obtained.

In the step S611, the CPU 15 readjusts the exposure time Tv, the ISO sensitivity, and the number of images to be combined to obtain a proper exposure amount. For example, the CPU 15 increases the exposure time Tv to a long time by increasing the same by within ⅓ stop to obtain a proper exposure amount. If the exposure amount is insufficient in spite of this adjustment, the CPU 15 increases the ISO sensitivity by within ⅓-stop to obtain a proper exposure amount. If the exposure amount is still insufficient, the CPU 15 increases the number of images to be combined to a value within a range up to 1.3 times (to an integer value formed by rounding down decimals) to obtain a proper exposure amount. If the exposure amount is still insufficient, the CPU 15 repeats these operations until a proper exposure amount is obtained.

Note that the exposure time Tv, the ISO sensitivity, and the number of images to be combined are limited due to the hardware configuration. Therefore, in the steps S610 and S611, in a case where the exposure amount is still insufficient even when these values reach the limited values, the values are clipped to the limited values. If a proper exposure amount can be obtained by the above-described processing operations, the CPU 15 finally determines the exposure coefficients and the setting of the continuous photographing mode, followed by terminating the process in FIG. 6.

According to the present embodiment, the exposure conditions are controlled based on a type of the continuous photographing mode (very high-speed, high-speed, or low-speed), the object vector (object motion), and the camera-shake signal (camera-shake information), and in a case where images are combined, the number of images to be combined is determined. With this, it is possible to obtain a high-quality image according to the continuous photographing mode and a state of a shake. For example, it is possible to suppress reduction of the image resolution caused by a shake, increase of noise in high-sensitivity photographing, and reduction of saturation.

Further, in a case where the continuous photographing mode is set, when a lower-speed continuous photographing mode is set, there is performed at least one of processing operations for making the exposure time longer, making the number of images to be combined smaller, and making the ISO sensitivity lower. With this, it is possible to obtain a high-quality image with the settings of the exposure condition and the number of images to be combined, which are suitable for the continuous photographing speed.

Further, in a case where the motion of the object is larger, the exposure time Tv is set to be shorter. Further, the limit exposure time TvLMT is set based on the magnitude of the motion of the object. With this, it is possible to obtain an image in which reduction of the resolution caused by a shake is suppressed.

Further, since a camera-shake signal concerning a shake of the image capturing apparatus 100 is acquired from the background vectors separated from the motion vectors and detected gyro signals, it is possible to accurately grasp a shake of the image capturing apparatus 100.

Note that in the present embodiment, the description has been given of the example in which each image to be combined is insufficient in exposure, and the proper exposure is obtained when all images for combination are added up. However, all images for combination may be averaged by increasing the sensitivity to make each image proper in exposure, or both of addition and averaging may be used.

Further, although the example in which shake correction is not performed before starting exposure is described, shake correction may be always performed. In this case, the vector information becomes information subjected to shake correction, and hence to obtain the actual motion, it is necessary to obtain a value by subtracting a shake correction amount from the detected vector.

Note that in the step S605, the continuous photographing mode may be changed to the low-speed continuous photographing mode, and the exposure time Tv may be set to be long.

Note that the present invention may be applied to the image capturing apparatus body 1 or may be applied to a lens-integrated type image capturing apparatus. Further, an image capturing apparatus body without having an interchangeable lens, such as the image capturing apparatus body 1, may be referred to as the image capturing apparatus.

Figure 8:
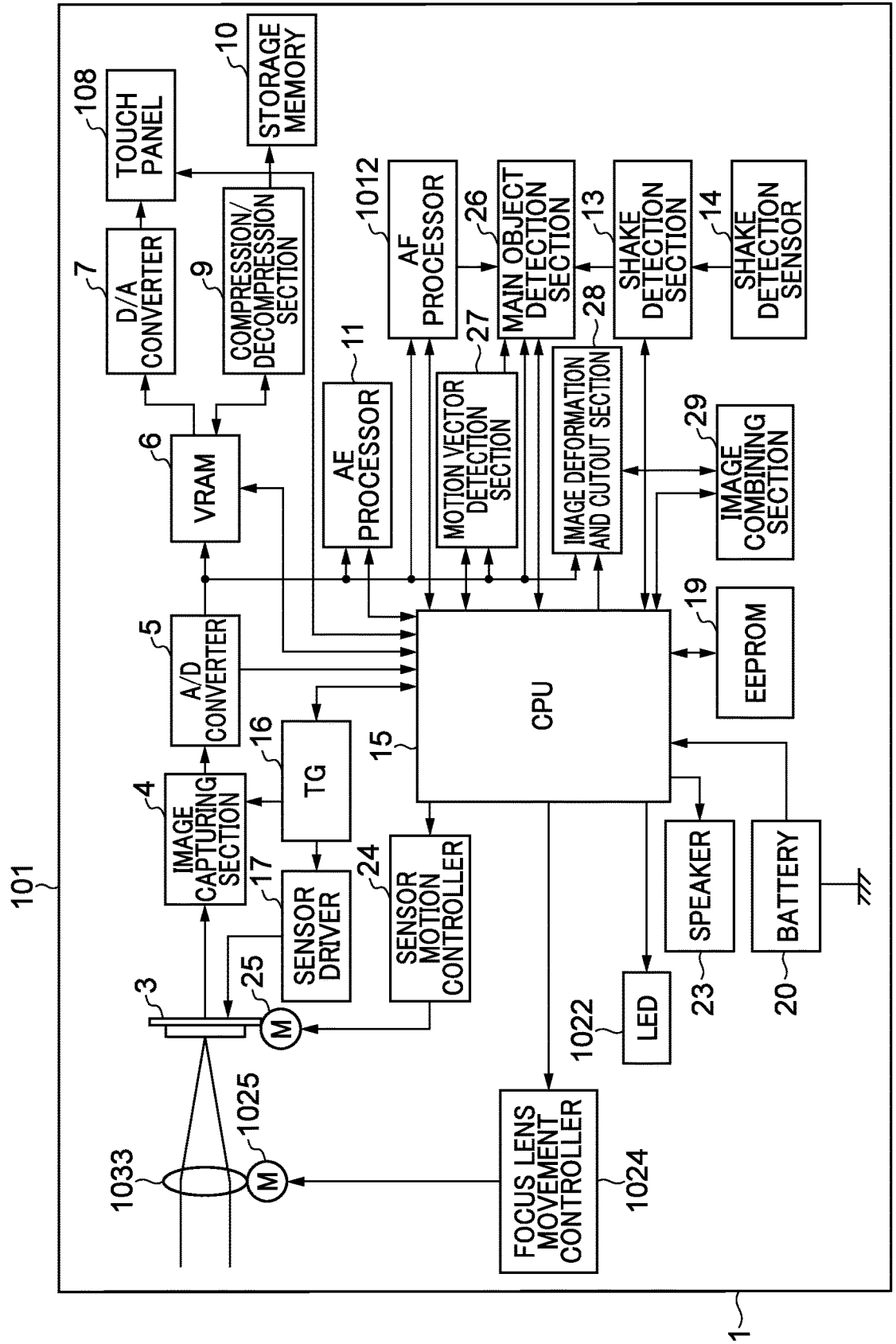
FIG. 8 is a block diagram of an image capturing apparatus.

Next, a description will be given of a second embodiment of the present invention. FIG. 8 is a block diagram of an image capturing apparatus according to the second embodiment. In the present embodiment, the image capturing apparatus, denoted by reference numeral 101, is configured as an information communication terminal, such as a smartphone. In FIG. 8, the same component elements as those of the first embodiment are denoted by the same reference numerals, and description thereof is omitted.

In the image capturing apparatus 101, a touch panel 108 is an image display input device. The touch panel 108 has a function of displaying an image using e.g. a liquid crystal display device (LCD) and an input function using the touch panel. An AF processor 1012 receives an output from the analog-to-digital converter 5 and generates an AF evaluation value for performing automatic focus adjustment (AF) processing. An LED 1022 is a display device that also has a function of illumination when AF processing is performed and a function of a flashlight, and performs incoming call notification and the like.

A focus lens-driving motor 1025 drives a focus lens 1033 in the optical axis direction. A focus lens motion controller 1024 controls the focus lens-driving motor 1025. Through an operation performed by the user on the touch panel 108, it is possible to perform selection not only between the single photographing mode and the continuous photographing mode, but also, in a case where the continuous photographing mode is selected, selection form a plurality of continuous photographing modes different in continuous photographing speed, similarly to the first embodiment.

The CPU 15 instructs the AF processor 1012 to generate an AF evaluation value while controlling the focus lens motion controller 1024 and the focus lens-driving motor 1025 to move the focus lens 1033. Then, the CPU 15 records this AF evaluation value in a state associated with the position of the focus lens 1033 and calculates the position of the focus lens 1033 at which the AF evaluation value reaches a peak. Further, the CPU 15 determines an in-focus position (position to which the focus lens 1033 is moved) by performing correction value calculation on the calculated position, by taking a variety of characteristics of the optical system into consideration. Then, the CPU 15 can perform the AF control for obtaining the in-focus state by controlling the focus lens 1033 to the determined in-focus position.

Figure 9:
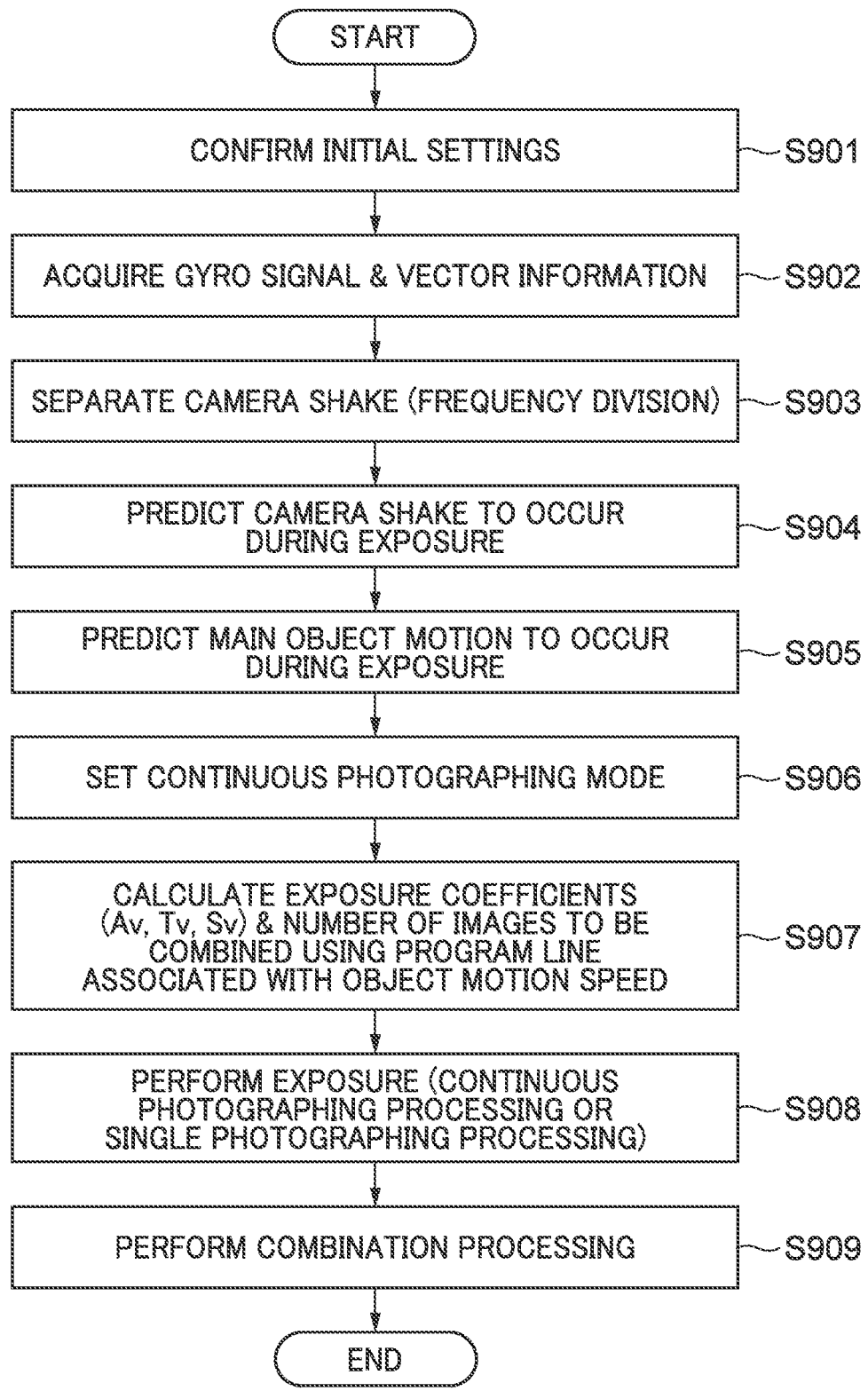
FIG. 9 is a flowchart of an exposure control process.

FIG. 9 is a flowchart of an exposure control process. This process is realized by the CPU 15 that loads an associated program stored in the EEPROM 19 into the RAM, not shown, included in the CPU 15 and executes the loaded program. This process is started when the single or continuous photographing mode is set. This process corresponds to the process in FIG. 2 in the first embodiment.

In a step S901, the CPU 15 performs processing operations, such as initialization of variables used in this process and moving of the driving members to the initial positions, and confirms the set photographing mode (such as the shutter speed priority mode, the aperture priority mode, the sport mode, or the scenery mode).

In steps S902 and S903, the CPU 15 executes the same processing operations as in the steps S203 and S204 in FIG. 2. Therefore, the gyro signals subjected to the filter processing, which have been obtained in the step S902, become a camera-shake signal. However, in the smartphone, the apparatus itself is light and there is no member for supporting the apparatus, such as a grip, and hence a low-frequency large camera shake is likely to occur. In view of this, the low-frequency large camera shake is eliminated by combining images photographed in a short exposure time. A high-frequency minute shake included in each one image is eliminated by moving the shake detection sensor 14 in the horizontal, vertical, and rotational directions. To do this, the shake detection section 13 performs high-pass filter processing to extract only high-frequency shake components.

In a step S904, similarly to the step S205, the CPU 15 predicts a frequency and an amount of a camera shake for each frequency to occur during exposure, by analyzing the frequency of the camera-shake signals generated in a predetermined time period before the start of photographing and obtained in the step S903. In a step S905, the CPU 15 predicts motion of the main object to occur during exposure, similarly to the step S206.

In a step S906, the CPU 15 sets the continuous photographing mode (and its type). In the smartphone, it is assumed that the type of the continuous photographing mode is not intentionally set. Therefore, the CPU 15 sets the continuous photographing mode based on a scene determination result obtained by a scene determination function equipped in the smartphone, the battery remaining amount, and an estimated margin of the correction stroke. This processing is the same as the processing in the step S604, which is performed in the case where the continuous photographing mode is not intentionally set.

For example, in a case where the battery remaining amount is less than a predetermined remaining amount, the CPU 15 sets the low-speed continuous photographing mode, and in a case where the estimated margin of the correction stroke is small, the CPU 15 also sets the low-speed continuous photographing mode. In the other cases, the CPU 15 sets the continuous photographing mode based on a scene determination result. Note that the estimated margin of the correction stroke can be obtained from the camera shake amount to occur during exposure, which has been predicted in the step S904, and the position of a sensor driving system element, not shown, for shake correction (deviated amount from the center) at the time. For example, in a case where a deviation amount is equal to or larger than 30% of the total correction stroke, it is determined that the estimated margin of the correction stroke is small.

The setting of the continuous photographing mode based on a scene determination result is performed based on a speed of motion of the main object, which is obtained from the motion vector information and the AF information, a photographing distance obtained from the AF information, a brightness obtained from the AE information, and so forth. The outline of the setting is the same as that in the first embodiment. Note that since the image capturing apparatus 101 is the smartphone, for example, processing for estimating a photographing point from a season time and position information may be performed by a server, and a preferable continuous photographing mode may be set based on a result of the processing.

Figure 10:
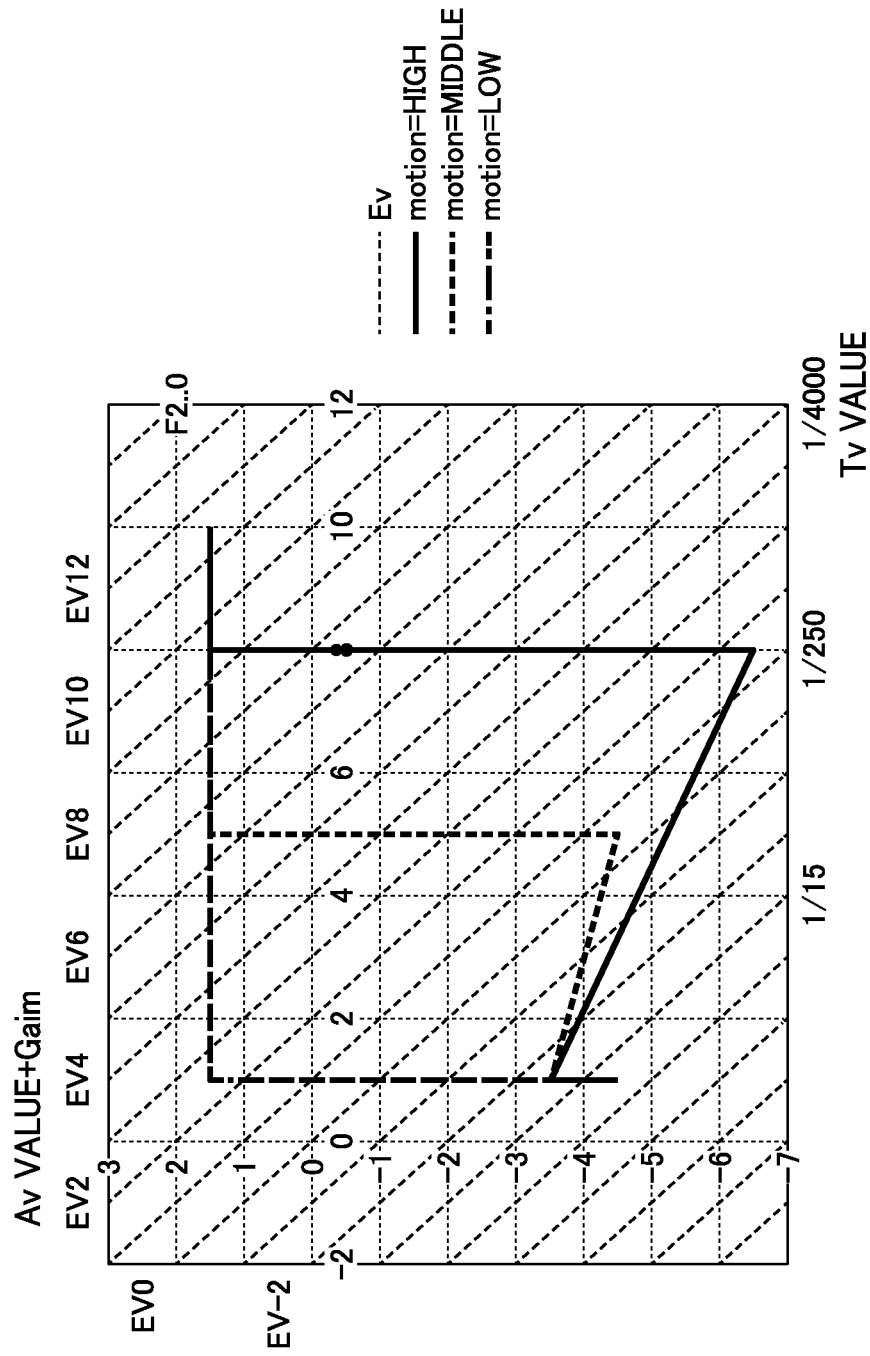
FIG. 10 is an example of a program diagram.
Figure 11:
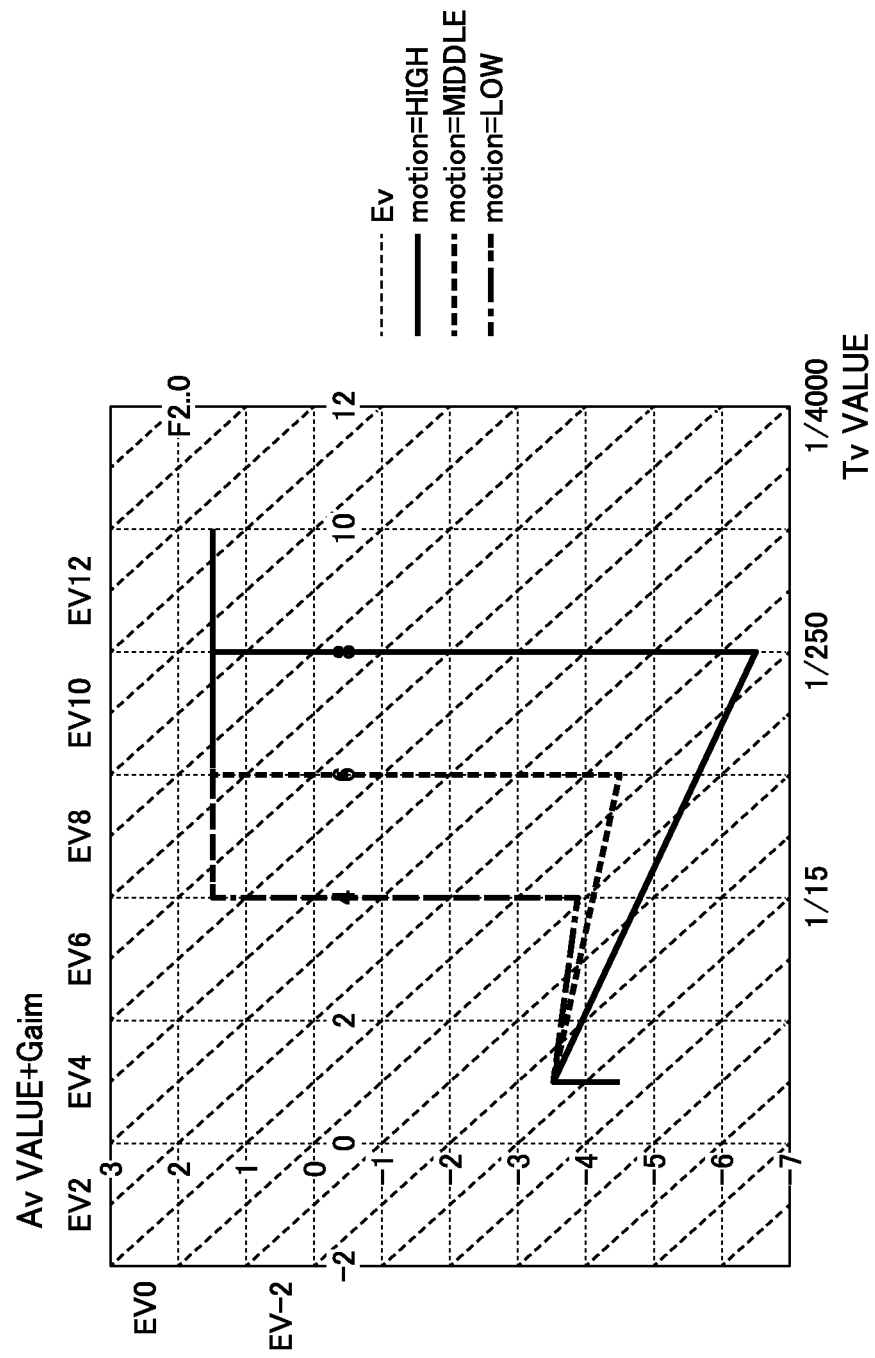
FIG. 11 is an example of a program diagram.

In a step S907, the CPU 15 sets the three exposure coefficients according to a program diagram shown in FIG. 10 or 11.

FIGS. 10 and 11 are diagrams each showing an example of a program diagram used for setting the exposure coefficients. The program diagram shown in FIG. 10 is applied in a case where the low-speed continuous photographing mode is set. The program diagram shown in FIG. 11 is applied in a case where the high-speed continuous photographing mode is set. Note that besides these program diagrams, there may be provided a program diagram to be applied in a case where the very high-speed continuous photographing mode is set. Alternatively, in the case where the very high-speed continuous photographing mode is set, the program diagram shown in FIG. 11 may be applied.

Referring to FIGS. 10 and 11, a solid line is associated with a case where the object motion is large (larger than a first predetermined value), a broken line is associated with a case where the object motion is medium (smaller than the first predetermined value and equal to or larger than a second predetermined value), and a one-dot-chain line is associated with a case where there is no object motion (smaller than the second predetermined value). According to these program lines, in a case where a relatively low-speed continuous photographing mode is set, a relatively small number of images to be combined, a relatively long exposure time, and a relatively low ISO sensitivity are set. Further, in a case where a relatively high-speed continuous photographing mode is set, a relatively large number of images to be combined, a relatively short exposure time, and a relatively high ISO sensitivity are set. However, these program lines are only used by way of example, but other program lines may be employed.

In a step S907, in a case where a proper exposure amount cannot be obtained by setting the exposure coefficients, the CPU 15 repeats the processing for resetting the exposure time, the number of images to be combined, and/or the ISO sensitivity until a propter exposure amount can be obtained.

For example, the CPU 15 extends the exposure time to obtain a proper exposure amount according to the brightness, and when the exposure time reaches a predetermined exposure time, the CPU 15 increases the ISO sensitivity e.g. by 2 stops. Then, the CPU 15 increases the number of images to be combined (for example, up to four images), and if a proper exposure amount cannot be obtained in spite of this adjustment, the CPU 15 increases the ISO sensitivity again e.g. by 1.5 stops.

If the exposure amount is insufficient in spite of this adjustment, in a case where the object does not move (less than the second predetermined value), the CPU 15 does not perform the control any more and finally determines the exposure coefficients. In a case where the object motion is medium (smaller than the first predetermined value and equal to or larger than the second predetermined value), the CPU 15 extends the exposure time (e.g. up to ½ seconds), and reduces the ISO sensitivity by approximately 1 stop. Further, the CPU 15 further increases the ISO sensitivity by approximately 1 stop again to adjust the exposure to the proper exposure. If the exposure amount is still insufficient at this time point, the CPU 15 does not perform the control any more and finally determines the exposure coefficients.

In a case where the motion of the object is large (larger than the first predetermined value), the CPU 15 increases the number of images to be combined (e.g. up to 16 images), then extends the exposure time (e.g. up to ½ seconds), and reduces the ISO sensitivity by approximately 1-stop. Further, the CPU 15 increases the ISO sensitivity by approximately 1-stop again to adjust the exposure to the proper exposure. If the exposure amount is still insufficient at this time point, the CPU 15 does not perform the control any more and finally determines the exposure coefficients.

In steps S908 and S909, the CPU 15 executes the same processing operations as in the steps S211 and S212.

According to the present embodiment, the program line to be used is changed according to a type of the continuous photographing mode. By applying the program line suitable for the type of the continuous photographing mode, in a case where a lower-speed continuous photographing mode is set, there is performed at least one of processing operations for making the exposure time longer, making the number of images to be combined smaller, and making the ISO sensitivity lower. As a result, it is possible to obtain the same advantageous effects as provided by the first embodiment in obtaining a high-quality image according to a continuous photographing mode and a state of a shake.

Further, even if the image capturing apparatus is configured such that a user does not or cannot intentionally set a type of the continuous photographing mode, the proper exposure coefficients and the proper number of images to be combined are set, and hence high usability can be obtained.

Note that the first embodiment may be applied to such an information communication terminal as described in the second embodiment, by way of example.

Note that also in the first embodiment, as the program diagrams, the program diagrams as shown in FIGS. 10 and 11, associated with the types of the continuous photographing mode, may be employed.

Note that in the first and second embodiments, the processing of the gyro signals has been described only with respect to one axis except for some of the description. However, in actuality, a camera shake and an object motion exist with respect to a plurality of axes, and hence the same processing can be applied with respect the other axes.

Note that although in the first and second embodiments, the brightness of the photographing environment is measured using a signal of a sensor for obtaining a photographed image, a dedicated photometry sensor provided separately from the sensor may be used.

Note that in the first and second embodiments, the number of types of the continuous photographing mode which can be set may be four or more.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-184173, filed Nov. 11, 2021, which is hereby incorporated by reference herein in its entirety.

What is claimed is:

1. An image capturing apparatus comprising:
at least one processor; and
a memory coupled to the at least one processor, the memory having instructions that, when executed by the processor, cause the processor to perform the operations of:
setting a plurality of types of a continuous photographing mode which are different in continuous photographing speed;
acquiring a motion of an object from an input image;
acquiring shake information concerning a shake of the image capturing apparatus;
controlling exposure conditions for photographing, based on a type of the continuous photographing mode, a motion of the object, and the shake information; and
determining, in a case where image combination is performed, the number of images to be combined based on an exposure amount obtained using the exposure conditions for photographing,
wherein in a case where the motion of the object is a second motion larger than a first motion, the processor makes exposure time shorter than in a case where the object motion is the first motion, and
wherein the processor determines a limit value of the exposure time which can be set on a longer side based on a magnitude of the motion of the object.

2. An image capturing apparatus comprising:
at least one processor; and
a memory coupled to the at least one processor, the memory having instructions that, when executed by the processor, cause the processor to perform the operations of:
setting a plurality of types of a continuous photographing mode which are different in continuous photographing speed;
acquiring a motion of an object from an input image;
acquiring shake information concerning a shake of the image capturing apparatus;
controlling exposure conditions for photographing, based on a type of the continuous photographing mode, a motion of the object, and the shake information; and
determining, in a case where image combination is performed, the number of images to be combined based on an exposure amount obtained using the exposure conditions for photographing,
wherein in a case where the motion of the object is a second motion larger than a first motion, the processor makes exposure time shorter than in a case where the object motion is the first motion, and
wherein the processor estimates a shake amount after correction to occur during exposure, based on an object distance and determines a limit value of the exposure time which can be set on a longer side based on an estimated shake amount.

3. The image capturing apparatus according to claim 1, wherein the processor acquires the motion of the object by separating vectors indicating a motion of a background and vectors indicating a motion of an object from motion vectors in the input image.

4. The image capturing apparatus according to claim 3, wherein the processor acquires the shake information based on the vector indicating the motion of the background separated from the motion vectors in the input image and a detection signal from a sensor for detecting a shake of the image capturing apparatus.

5. The image capturing apparatus according to claim 1, wherein the processor acquires the object motion and the shake information, which occur in a predetermined time period before start of photographing, respectively.

6. The image capturing apparatus according to claim 1, wherein in a case where the continuous photographing mode is set, the processor determines to perform image combination.

7. The image capturing apparatus according to claim 1, wherein in a case where a single photographing mode is set, the processor determines not to perform image combination.

8. The image capturing apparatus according to claim 1, wherein the processor sets a type of the continuous photographing mode based on a user operation.

9. An image capturing apparatus comprising:
at least one processor; and
a memory coupled to the at least one processor, the memory having instructions that, when executed by the processor, cause the processor to perform the operations of:
setting a plurality of types of a continuous photographing mode which are different in continuous photographing speed;
acquiring a motion of an object from an input image;
acquiring shake information concerning a shake of the image capturing apparatus;
controlling exposure conditions for photographing, based on a type of the continuous photographing mode, a motion of the object, and the shake information; and determining, in a case where image combination is performed, the number of images to be combined based on an exposure amount obtained using the exposure conditions for photographing, and wherein in a case where a type of the continuous photographing mode has not been set by a user operation, the processor determines a scene at least based on the motion of the object and sets a type of the continuous photographing mode according to a determined scene.

10. The image capturing apparatus according to claim 9, wherein the processor sets a type of the continuous photographing mode, by further taking into consideration a battery remaining amount or a stroke of a sensor driving system for shake correction.

11. The image capturing apparatus according to claim 1, wherein the memory having instructions that, when executed by the processor, perform the operations of:

combining photographed images corresponding in number to the number of images to be combined, in the continuous photographing mode.

12. A method of controlling an image capturing apparatus, comprising:

setting a plurality of types of a continuous photographing mode which are different in continuous photographing speed;

acquiring a motion of an object from an input image;

acquiring shake information concerning a shake of the image capturing apparatus;

controlling exposure conditions for photographing, based on a type of the continuous photographing mode, the motion of the object, and the shake information; and determining, in a case where image combination is performed, the number of images to be combined based on an exposure amount obtained using the exposure conditions for photographing, wherein in a case where the motion of the object is a second motion larger than a first motion, exposure time is shorter than in a case where the object motion is the first motion, and wherein a limit value of the exposure time which can be set on a longer side based on a magnitude of the motion of the object is determined.

13. A non-transitory computer-readable storage medium storing a program for causing a computer to execute a method of controlling an image capturing apparatus, wherein the method comprises:

setting a plurality of types of a continuous photographing mode which are different in continuous photographing speed;

acquiring a motion of an object from an input image;

acquiring shake information concerning a shake of the image capturing apparatus;

controlling exposure conditions for photographing, based on a type of the continuous photographing mode, the motion of the object, and the shake information; and determining, in a case where image combination is performed, the number of images to be combined based on an exposure amount obtained using the exposure conditions for photographing, wherein in a case where the motion of the object is a second motion larger than a first motion, exposure time is shorter than in a case where the object motion is the first motion, and wherein a limit value of the exposure time which can be set on a longer side based on a magnitude of the motion of the object is determined.

14. A method of controlling an image capturing apparatus, comprising:

setting a plurality of types of a continuous photographing mode which are different in continuous photographing speed;

acquiring a motion of an object from an input image;

acquiring shake information concerning a shake of the image capturing apparatus;

controlling exposure conditions for photographing, based on a type of the continuous photographing mode, the motion of the object, and the shake information; and determining, in a case where image combination is performed, the number of images to be combined based on an exposure amount obtained using the exposure conditions for photographing, wherein in a case where the motion of the object is a second motion larger than a first motion, exposure time is shorter than in a case where the object motion is the first motion, and wherein a shake amount after correction to occur during exposure, based on an object distance and determines a limit value of the exposure time which can be set on a longer side based on an estimated shake amount, is estimated.

15. A non-transitory computer-readable storage medium storing a program for causing a computer to execute a method of controlling an image capturing apparatus, wherein the method comprises:

setting a plurality of types of a continuous photographing mode which are different in continuous photographing speed;

acquiring a motion of an object from an input image;

acquiring shake information concerning a shake of the image capturing apparatus;

controlling exposure conditions for photographing, based on a type of the continuous photographing mode, the motion of the object, and the shake information; and determining, in a case where image combination is performed, the number of images to be combined based on an exposure amount obtained using the exposure conditions for photographing, wherein in a case where the motion of the object is a second motion larger than a first motion, exposure time is shorter than in a case where the object motion is the first motion, and wherein a shake amount after correction to occur during exposure, based on an object distance and determines a limit value of the exposure time which can be set on a longer side based on an estimated shake amount, is estimated.

16. A method of controlling an image capturing apparatus, comprising:

setting a plurality of types of a continuous photographing mode which are different in continuous photographing speed;

acquiring a motion of an object from an input image;

acquiring shake information concerning a shake of the image capturing apparatus;

controlling exposure conditions for photographing, based on a type of the continuous photographing mode, the motion of the object, and the shake information; and determining, in a case where image combination is performed, the number of images to be combined based on an exposure amount obtained using the exposure conditions for photographing, wherein in a case where a type of the continuous photographing mode has not been set by a user operation, a scene at least based on the motion of the object is determined, and a type of the continuous photographing mode according to a determined scene is set.

17. A non-transitory computer-readable storage medium storing a program for causing a computer to execute a method of controlling an image capturing apparatus,
wherein the method comprises:
setting a plurality of types of a continuous photographing mode which are different in continuous photographing speed;
acquiring a motion of an object from an input image;
acquiring shake information concerning a shake of the image capturing apparatus;
controlling exposure conditions for photographing, based on a type of the continuous photographing mode, the motion of the object, and the shake information; and
determining, in a case where image combination is performed, the number of images to be combined based on an exposure amount obtained using the exposure conditions for photographing,
wherein in a case where a type of the continuous photographing mode has not been set by a user operation, a scene at least based on the motion of the object is determined, and a type of the continuous photographing mode according to a determined scene is determined is set.

* * * * *